(12) United States Patent
Leventhal

(10) Patent No.: US 9,785,623 B2
(45) Date of Patent: Oct. 10, 2017

(54) IDENTIFYING A SET OF RELATED VISIBLE CONTENT ELEMENTS IN A MARKUP LANGUAGE DOCUMENT

(71) Applicant: Freedom Scientific, Inc., St. Petersburg, FL (US)

(72) Inventor: Aaron M. Leventhal, Winchester, MA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 293 days.

(21) Appl. No.: 14/603,254

(22) Filed: Jan. 22, 2015

(65) Prior Publication Data

US 2015/0205797 A1    Jul. 23, 2015

Related U.S. Application Data

(60) Provisional application No. 61/930,153, filed on Jan. 22, 2014.

(51) Int. Cl.
  *G06F 17/30* (2006.01)
  *G06F 17/22* (2006.01)
  *G06F 17/21* (2006.01)

(52) U.S. Cl.
  CPC ........ *G06F 17/2247* (2013.01); *G06F 17/212* (2013.01); *G06F 17/2229* (2013.01); *G06F 17/3053* (2013.01); *G06F 17/30908* (2013.01)

(58) Field of Classification Search
  None
  See application file for complete search history.

(56) References Cited

U.S. PATENT DOCUMENTS 8,245,049 B2 * 8/2012 Ramani ................. H04L 63/102
                                                   713/182
8,640,048 B1 * 1/2014 Parsons ............... G06F 17/2247
                                                   715/206

(Continued)

OTHER PUBLICATIONS

International Search Report and Written Opinion dated Jun. 29, 2015 for Application No. PCT/US2015/12520.

(Continued)

*Primary Examiner* — Hung Le
(74) *Attorney, Agent, or Firm* — Andriy Lytvyn; Smith & Hopen, P.A.

(57) ABSTRACT

Some described embodiments relate to techniques for editing markup elements of a markup language document to emphasize a portion of the visible content elements of the markup language document. The techniques may be implemented in any suitable manner, including via scripting language code (e.g., JavaScript) that is incorporated into the markup language document but is not preconfigured with information regarding the markup language document or any other markup language document. The scripting language code may perform the editing automatically, and based on an automatic analysis of markup elements of the markup language document. Some embodiments may include determining the portion of the markup language document to be emphasized by identifying content of interest to a user, including by determining a set of related content through analyzing a structure of markup elements of the markup language document and/or layout of visible content elements of the markup language document.

21 Claims, 17 Drawing Sheets

(56) References Cited

U.S. PATENT DOCUMENTS

| | | | |
|---|---|---|---|
| 9,355,079 B2* | 5/2016 | Harrison | |
| 9,588,653 B2* | 3/2017 | Schmidt | G06F 3/0484 |
| 2002/0015042 A1* | 2/2002 | Robotham | G06F 3/14 |
| | | | 345/581 |
| 2004/0139400 A1* | 7/2004 | Allam | G06F 17/212 |
| | | | 715/201 |
| 2005/0071364 A1 | 3/2005 | Xie et al. | |
| 2005/0278792 A1* | 12/2005 | Ramani | H04L 63/104 |
| | | | 726/27 |
| 2006/0248097 A1* | 11/2006 | Pritchard | G06F 8/71 |
| 2006/0288278 A1* | 12/2006 | Kobayashi | G06F 17/212 |
| | | | 715/209 |
| 2007/0050703 A1* | 3/2007 | Lebel | G06F 17/3089 |
| | | | 715/234 |
| 2008/0002964 A1 | 1/2008 | Edwards | |
| 2008/0148147 A1 | 6/2008 | Poston et al. | |
| 2008/0270476 A1* | 10/2008 | Flake | G06Q 30/02 |
| 2008/0307301 A1* | 12/2008 | Decker | G06F 17/30905 |
| | | | 715/241 |
| 2009/0055375 A1* | 2/2009 | Oestlien | G06F 17/30598 |
| 2010/0199195 A1* | 8/2010 | Carounanidy | G06F 17/30905 |
| | | | 715/760 |
| 2010/0199215 A1* | 8/2010 | Seymour | G06F 3/0481 |
| | | | 715/808 |
| 2011/0161843 A1* | 6/2011 | Bennett | G06F 3/14 |
| | | | 715/760 |
| 2012/0069131 A1* | 3/2012 | Abelow | G06Q 10/067 |
| | | | 348/14.01 |
| 2012/0240185 A1* | 9/2012 | Kapoor | H04L 63/1425 |
| | | | 726/1 |
| 2012/0304316 A1* | 11/2012 | Ramani | H04L 63/104 |
| | | | 726/30 |
| 2013/0205246 A1* | 8/2013 | Schmidt | G06F 17/2235 |
| | | | 715/781 |
| 2014/0026034 A1* | 1/2014 | Harrison | G06F 17/30899 |
| | | | 715/234 |
| 2014/0195921 A1* | 7/2014 | Grosz | G06F 3/1242 |
| | | | 715/738 |
| 2014/0344736 A1* | 11/2014 | Ryman | G06F 3/04883 |
| | | | 715/767 |
| 2015/0161277 A1* | 6/2015 | Heller | G06F 9/44526 |
| | | | 715/229 |

OTHER PUBLICATIONS

Wai-Aria Overview. Dec. 2006. http://www.w3.org/WAI/intro/aria.php, [last accessed Jun. 2, 2015].
"Point in Polygon aka hit test.".http://stackoverflow.com/questions/217578/point-in-polygon-aka-hit-test, [last accessed Jun. 2, 2015].
Stackoverflow "Sort Anticlockwise the points of rectilinear polygon." http://stackoverflow.com/questions/17862162/sort-anticlockwise-the-points-of-rectilinear-polygon#answer-17863840, [last accessed Jul. 28, 2015].
U.S. Appl. No. 12/720,090, filed Mar. 9, 2010, Demar et al.
U.S. Appl. No. 12/777,739, filed Mar. 11, 2010, Moore et al.
U.S. Appl. No. 14/017,810, filed Sep. 4, 2013, Leventhal et al.
U.S. Appl. No. 14/017,828, filed Sep. 4, 2013, Leventhal et al.
U.S. Appl. No. 14/018,378, filed Sep. 4, 2013, Leventhal et al.
U.S. Appl. No. 14/569,499, filed Dec. 12, 2015, Leventhal et al.
U.S. Appl. No. 14/569,558, filed Dec. 12, 2014, Leventhal et al.
U.S. Appl. No. 14/569,571, filed Dec. 12, 2014, Leventhal et al.
U.S. Appl. No. 14/569,578, filed Dec. 12, 2014, Leventhal et al.
U.S. Appl. No. 14/603,242, filed Jan. 22, 2015, Leventhal et al.
U.S. Appl. No. 14/603,263, filed Jan. 22, 2015, Leventhal et al.
U.S. Appl. No. 14/603,232, filed Jan. 22, 2015, Leventhal et al.
PCT/US2015/12520, dated Jun. 29, 2015, International Search Report and Written Opinion.

* cited by examiner

IDENTIFYING A SET OF RELATED VISIBLE CONTENT ELEMENTS IN A MARKUP LANGUAGE DOCUMENT

RELATED APPLICATIONS

This application claims priority under 35 U.S.C. §119(e) to U.S. Provisional Application Ser. No. 61/930,153, titled "Intelligent Content Lens" and filed on Jan. 22, 2014, the entire contents of which are herein incorporated by reference.

BACKGROUND

Markup languages include markup elements that may serve to identify or describe content, including that describe how visible content is to be rendered for display. A markup language document may include markup elements describing a content and/or formatting of content of the document.

Web pages are an example of markup language documents. A web page may be implemented as a set of one or more markup language documents, each of which may include content described using Hypertext Markup Language (HTML) elements or Cascading Style Sheet (CSS) elements, and/or elements of other markup languages. The markup elements of a web page may identify text content, image content, scripting language content, or other forms of content and may, for visible content elements, identify a manner in which the visible content elements are to be rendered. For example, the markup elements may identify a size or placement of visible content elements such as an image, or may describe a formatting of visible content elements such as text. A web browser may, upon download of a web page, review the markup elements of one or more markup language documents and render the visible content elements of the web page on a display based on the markup elements.

SUMMARY

In one embodiment, there is provided a method comprising identifying a first visible content element of at least one markup language document and automatically determining whether the first visible content element is a member of a group of visible content elements distinct from surrounding visible content elements. The automatically determining comprises analyzing a layout of visible content elements of the at least one markup language document in an area of the at least one markup language document that includes the first visible content element to determine whether the layout indicates that the first visible content element is a member of a group of visible content elements distinct from surrounding visible content elements and analyzing one or more markup elements of the at least one markup language document to determine whether the one or more markup elements indicate that the first visible content element is a member of a group of visible content elements distinct from surrounding visible content elements.

In another embodiment, there is provided at least one computer-readable storage medium having encoded thereon at least one markup language document, the at least one markup language document having incorporated therein executable instructions that, when executed by at least one processor, cause the at least one processor to carry out a method. The method comprises identifying a first visible content element, of the at least one markup language document, indicated by user input, determining, from a hierarchical arrangement of content elements of the at least one markup language document, one or more parent content elements directly above the first visible content element in the hierarchical arrangement, and analyzing each one parent content element of the one or more parent content elements to determine whether the one parent content element includes a distinct set of visible content elements that include the first visible content element and satisfy criteria indicating that a publisher of the at least one markup language document intended for the distinct set of visible content elements to be viewed together as a group.

In a further embodiment, there is provided an apparatus comprising at least one processor and at least one computer-readable storage medium having encoded thereon at least one markup language document having incorporated therein instructions, wherein the instructions, when executed by the at least one processor, cause the at least one processor to carry out a method. The method comprises identifying a first visible content element of at least one markup language document and automatically determining whether the first visible content element is a member of a group of visible content elements distinct from surrounding visible content elements. The automatically determining comprises analyzing a layout of visible content elements of the at least one markup language document in an area of the at least one markup language document that includes the first visible content element to determine whether the layout indicates that the first visible content element is a member of a group of visible content elements distinct from surrounding visible content elements, and analyzing one or more markup elements of the at least one markup language document to determine whether the one or more markup elements indicate that the first visible content element is a member of a group of visible content elements distinct from surrounding visible content elements.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
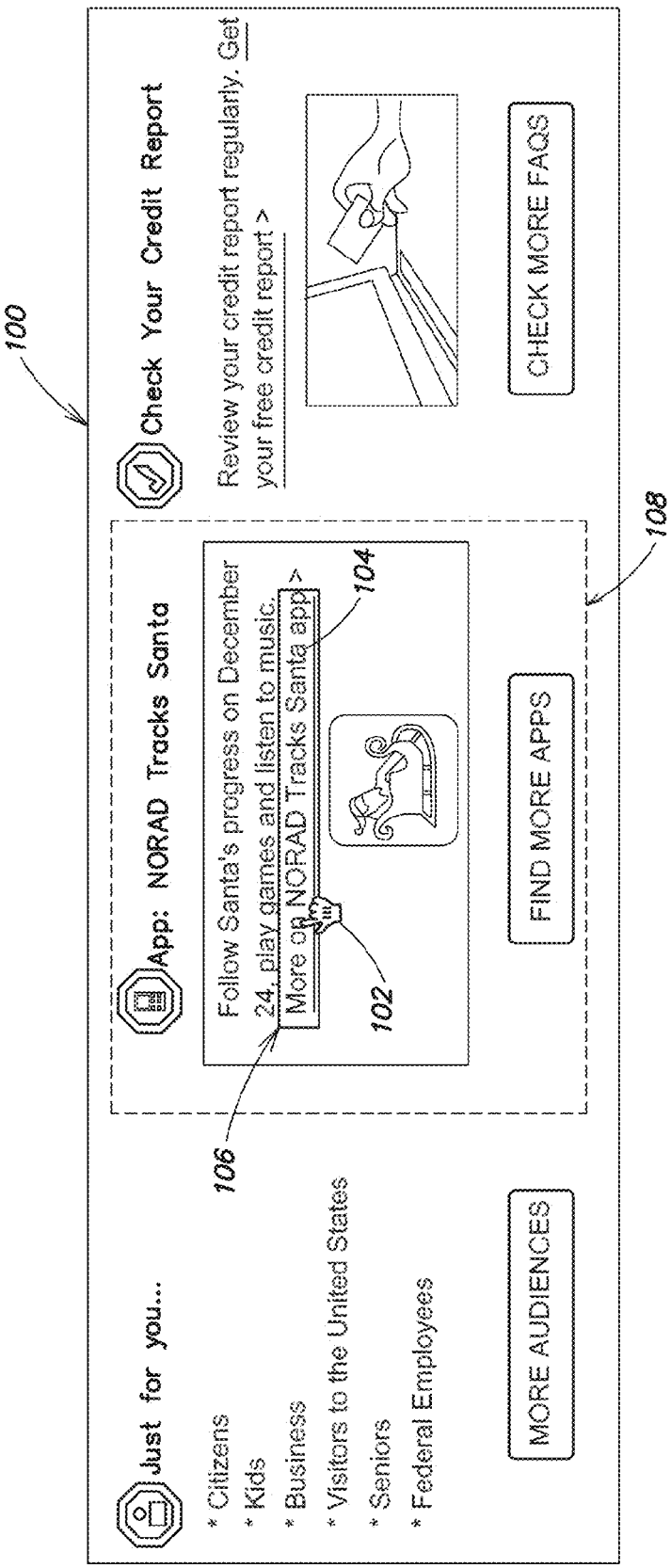
FIGS. 1A-1D are illustrations of examples of markup language documents with which techniques described herein may operate.

Embodiments described herein relate to techniques for editing markup elements of a markup language document to emphasize a portion of the visible content elements of the markup language document, such as some of the pictures and text of a web page. The techniques may be implemented in any suitable manner, including via scripting language code (e.g., JavaScript) that is incorporated into the markup language document but is not preconfigured with information regarding the markup language document or any other markup language document, thus making the scripting language code reusable between markup language documents, including between markup language documents that are available from or produced by different publishers (e.g., different web developers or other different authors) or are available from different sources, or are otherwise unrelated documents. The scripting language code may perform the editing automatically, and based on an automatic analysis of markup elements of the markup language document.

In some embodiments, the techniques may include determining the portion of the markup language document to be emphasized by identifying content of interest to a user, including by determining a set of related content through analyzing a structure of markup elements of the markup language document and/or layout of visible content elements of the markup language document. For example, when a user indicates interest in a specific visible content element in the markup language document, such as by hovering a cursor of a pointing device over that specific content element, a selection facility may analyze a structure of the markup elements relating to that visible content element and other visible content elements, and/or a layout of that visible content element and other visible content elements, to determine a set of content that is conceptually related. The set of content identified by the selection facility may be content that the structure and/or layout of the markup language document suggests a user may want to view together or that a publisher of the markup language document intended to be viewed together.

In some embodiments, once the portion of the markup language document is determined, the portion may be emphasized in any suitable manner. In some embodiments, for example, the portion may be emphasized by improving a visibility of the portion. To improve the visibility of the portion, a format of the portion may be changed to visually separate the portion from surrounding content. By visually separating the portion, it may be easier for some users to perceive. To visually separate the portion and/or otherwise improve visibility of the portion, a format of the portion may be changed to be different from surrounding content. For example, font attributes such as color or typeface may be changed, or a background of the portion may be changed, to be different from surrounding content. As another example, a border may be placed around the portion to make it stand out more from surrounding content. As still another example of improving the visibility of the portion, the markup language document may be edited to display the portion in a larger size, such as by magnifying the portion. In some embodiments, while the visibility of the portion is increased, other portions of the markup language document may be maintained in a same format (e.g., not be displayed in a larger size) or in a default format. In some embodiments, surrounding content may be grayed out to aid in emphasizing the portion.

Many traditional magnification techniques include magnifying an entire screen or entire content, such as an entire web page, by the same amount at one time. Though, magnification of portions of content, including web content, has also been performed. In a first technique that has been used for magnifying portions of content, a movable "lens" is fixed to the cursor of a pointing device, such as a mouse cursor, and a user drags the lens around a display screen to magnify different content. In a second technique, a fixed lens is displayed, such as anchored to a side or corner of a screen, that magnifies content displayed in an area around a cursor of a pointing device as the user moves the cursor in a display screen.

The inventor has recognized and appreciated that these previously-available techniques may have certain disadvantages in some environments. For example, for some users who have difficulty viewing information on computer screens, such as users with difficulties with their eyesight, it may be difficult to distinguish a portion of the content from surrounding content, making it difficult, for example, to read a section of a web page. In that case, magnifying an entire screen or an entire content at once may not help those users, as the surrounding content would still be the same size as the desired content, despite the increase in display size. The first "lens" approach may also be difficult for some users to use. When the lens is displayed over the content and moves with the cursor of the pointing device, the lens may be disorienting for a user. While the lens may magnify a section of the content and separate that content from its surroundings to make it easier to view, the lens may also obscure the surrounding content in a manner that may make it difficult for a user to see other content, such as adjacent content, that the user may also want to view via the lens and thus difficult for the user to move the lens to that other content. The second "lens" approach may also be disorienting for some users. The lens that is anchored to a side or corner of the screen may not obscure content in a way that could make it difficult for a user to operate, but may still be disorienting for users as they may need to constantly look back and forth between the lens view on one part of a display screen and another part of the display screen where the content is displayed and where the cursor of the pointing device is moving.

In each of these prior approaches, a graphical magnification technique is used by which a picture of the content to be magnified is generated and the picture enlarged and displayed. The inventor has recognized and appreciated that some of the disadvantages of these prior magnification techniques may be mitigated by techniques that instead edit the markup language document to emphasize a portion of the document, such as by directly editing markup elements of the document to increase a display size of the content or otherwise improve visibility of the content. The inventor has recognized and appreciated that by editing the markup language document to change a manner in which a portion of the markup language document is displayed, that portion may be emphasized in a manner that may improve visibility of the content without being disorienting to a user. By editing the visible content elements within the markup language document, the disadvantageous dual-view approach associated with an anchored lens may be avoided. Further, by editing the visible content elements in place, the markup elements may be in context without a disadvantageous lens fixed to a cursor and obscuring surrounding content.

The inventor has also recognized and appreciated that prior magnification techniques are often implemented using special software that is separately executed from software to view a markup language document, and that must be enabled by a user and subsequently disabled by a user to be used. The special software may form a portion of an operating system or be offered by a third party, for example. Some users require assistance with using computer interfaces, such as because of their unfamiliarity with the operations or computers or because of disabilities or difficulties of those users. For example, a person who has poor eyesight and is unfamiliar with the operations of computers may have difficulty using the traditional techniques discussed above, such as an elderly person who may have difficulty viewing content in a graphical user interface and more generally in operating a computer. Triggering such magnification functionality, and subsequently disabling that functionality when it is no longer necessary, may be a complex operation that may be difficult for or beyond the capabilities of some users.

For markup language documents like web pages, a viewing application like a web browser is typically responsible for handling display of content described by the markup language document. Markup language documents support the incorporation of executable instructions, such as scripting language code, into the markup language document. These instructions may be executed by the viewing application during processing and display of the markup language document. The inventor has recognized and appreciated that such scripting language code could be used to edit a markup language document to emphasize a portion of the visible content of the markup language document, including by improving visibility of the content. The inventor has additionally recognized and appreciated that incorporating functionality for editing the markup language document to improve visibility of content into the markup language document itself may be advantageous for some users, including users with disabilities or difficulties and/or that have limited experience with computers. By incorporating the functionality into the markup language document itself, users would need only to interact with the markup language document within the viewing application and would not need to learn how to trigger and use other functionality, such as of an operating system or third party.

Accordingly, discussed below are various embodiments of techniques for moving emphasizing visible content elements of at least one markup language document within a display area in response to user input. In embodiments, in response to user input (e.g., moving a cursor of a pointing device), a selection facility may determine one or more visible content elements that are content of interest to a user. As discussed in further detail below, while in some embodiments only the content over which the cursor is currently positioned may be selected as content of interest, in other embodiments the selection facility may analyze a structure and/or layout of the markup language document to determine other content that is related to the content over which the cursor is positioned. The related content may be, for example, other content that is conceptually related to the content over which the cursor is positioned, and/or content that the structure and/or layout suggests that a user may want to view, or that a publisher of the markup language document intended to be viewed, together with the content over which the cursor is positioned. By doing so, in these embodiments the content over which the cursor is positioned may be emphasized along with the related content and thereby emphasized in context.

In embodiments, an emphasis facility may then emphasize the content selected by the selection facility in any suitable manner, including to improve visibility of the selected content. Examples of emphasis techniques are discussed in more detail below. As one example, the emphasis facility may edit markup elements defining and/or describing the selected content to improve visibility of the selected content. The emphasis facility may, for example, change font properties or other display properties of the selected content. The emphasis facility may change a background color of, draw a border around, or otherwise highlight the selected content. The emphasis facility may additionally or alternatively change a display size of the selected content. The emphasis facility may, when making these edits to the selected content, not make corresponding changes to other content, such that the selected content may stand out from the original formatting of the other content. The emphasis facility may also, in some embodiments, de-emphasize other content, such as by graying out the other content. The emphasis facility may make these edits by editing markup elements of the markup language document, including by modifying existing markup elements and/or inserting new markup elements. The emphasis facility may also store information on original markup elements of the selected content and/or other content, and in response to a user input requesting that the emphasis be undone (e.g., when the user is done viewing the emphasized content), the emphasis facility may edit the markup language document to return the markup elements to the original.

For ease of description below, many of the examples will be given in the context of a single markup language document that is processed by a viewing application and for which visible content elements are displayed in a display area of the viewing application. It should be appreciated, however, that multiple markup language documents may be associated with one another and together describe visible content elements to be displayed in a display area of a viewing application, such that the viewing application may process the markup language documents together to display the visible content elements. As a specific example, a web page may be described by multiple markup documents, which may include one or more HTML documents and one or more CSS documents, among other markup documents or other files referenced by the markup language documents. The multiple documents of the web page may refer to one another or one (or more) of the documents may refer to the other documents. Accordingly, it should be appreciated that embodiments are not limited to evaluating one markup language document and any of the techniques described below (unless indicated otherwise) may be applied to multiple markup language documents, such as documents that are associated and together describe a set of visible content elements to be displayed in a display area of a viewing application.

The markup language document(s) with which embodiments may operate may be formatted in any suitable manner and include any suitable content, including any suitable visible content elements and markup elements in any suitable markup language, as embodiments are not limited in this respect. In some embodiments, the markup elements may be Hypertext Markup Language (HTML) and/or Cascading Style Sheet (CSS) markup elements and the content may be one or more files of a web page. Such one or more files of a web page that may be included as markup language documents may include files in any suitable format, including files that include HTML and/or files that include code (e.g., Active Server Pages (ASP), Java Server Pages (JSP), PHP Hypertext Preprocessor (PHP) code, or any other suitable code) that, when executed on a web server and/or a web browser of a client, output HTML elements or other markup elements. Such one or more files of a web page may additionally or alternatively include one or more style sheets, one or more files linked as defining content of a frame or otherwise referenced by an HTML file, or any other files that one of ordinary skill would appreciate could be included in a web page. Embodiments that operate with web pages are not limited to operating with any particular type of web page defined in any particular format, as embodiments may operate with any suitable web page.

Markup language documents like web pages may include visible content elements to be displayed to a user. Visible content elements may include any suitable content that may be displayed, including any suitable content that may be included in web pages or other markup language documents, as embodiments are not limited in this respect. Examples of visible content elements include blocks of text, images, tables, Adobe Flash objects, tables, forms, and other content. Those of skill in the art will appreciate that, in some cases, a markup language document may include non-visible content elements. Non-visible content elements may include elements that organize other content elements, such as container elements, and may also include types of content elements that may otherwise be visible but have been configured by markup elements not to be visible. For example, a developer of a web page may configure a picture or text not to be displayed or configure the picture/text to be included in the markup language document at a position that the picture/text would not appear within a display area of a viewing application (e.g., within a viewport of a web browser).

Figure 1B:
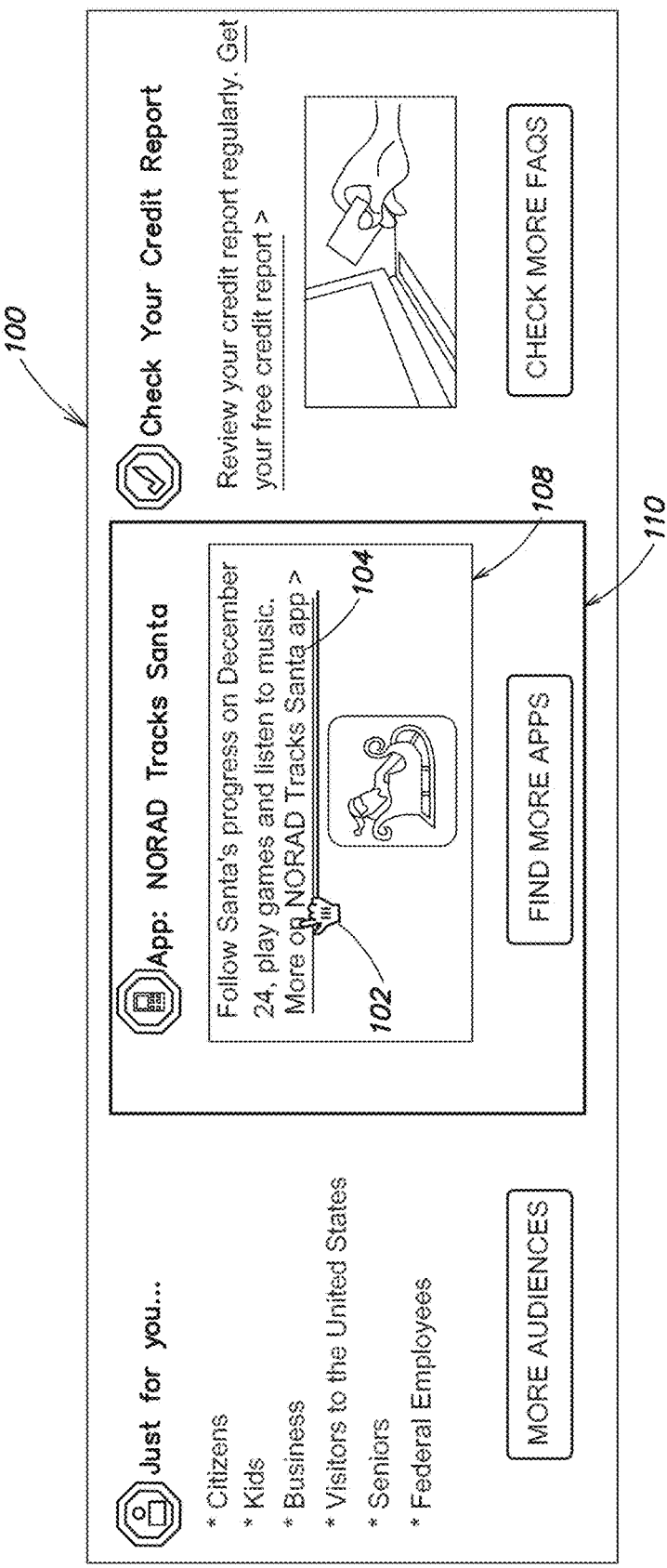

FIGS. 1A and 1B illustrate an example of a markup language document with which some embodiments may operate and effects of a selection facility that selects related content for emphasis. FIG. 1A illustrates a web page 100 that includes visible content elements including text and images. A user manipulates a cursor 102 of a pointing device (e.g., mouse, trackpad, or other pointing devices) to move within a display screen of a computing device on which the web page 100 is displayed. On the computing device, a viewing application such as a web browser may carry out known techniques to process one or more markup language documents describing the web page 100 and render and display visible content elements described by the markup language document(s). The user may move the cursor 102 within a user interface of the viewing application, including within a display area for markup language documents, which may be referred to as the viewport of the web browser.

It should be appreciated that the display area may be displayed on any suitable type of display screen of any suitable type of computing device, as embodiments are not limited in this respect. Though, the techniques described herein may have particular advantages when used in connection with computing devices that are personal computers, such as desktop or laptop personal computers, rather than with mobile computing devices such as tablets or smartphones.

Movements of the cursor 102 may indicate an interest of the user in content within the display area. For example, some users move the cursor 102 over whatever content the user is currently reading or otherwise viewing. Accordingly, a position of the cursor 102 may indicate an interest of the user in a particular content. In the example of FIG. 1A, the user has positioned the cursor 102 over the text 104 "More on NORAD tracks Santa app". Using emphasis techniques described herein, that text 104 may be emphasized and visually separated from surrounding content to make the text 104 easier to view. In the example of FIG. 1A, that emphasis is performed by adding a border 106 surrounding the text 104. As described in detail below, an emphasis facility may edit the web page 100 to insert new markup elements describing the border 106, or modify existing markup elements in a way that creates the border 106.

Though, while the text 104 is a specific single content over which the cursor 104 is positioned, it may be the case that isolating text 104 by visually separating the text 104 from all surrounding content may not be desirable for a user. For example, text 104 appears in web page 100 within a set of content 108 that is conceptually related to text 104. Specifically, all of the content 108 relates to an "app" published by NORAD for tracking Santa's progress on Christmas Eve. The publisher of the web page 100 (e.g., the web developer or other author of the content, or other party that released the web page 100) clearly positioned the content 108 together in the web page 100 as a distinct set separate from another distinct set on the left and another distinct set on the right, and may have intended that the content 108 be viewed together. Separately, content of the content 108 may be less valuable or harder to understand than if the content 108 were viewed together. Accordingly, while the cursor 104 may indicate that the user is, at a time, specifically interested in the text 104, the user may be viewing that text 104 in the context of the conceptually-related content 108. Emphasizing the text 104 in isolation would take the text 104 out of context in a way that might be harder for the user to understand or less desirable for any other reason. It may be better, then, if the text 104 were emphasized in context with other content of the set 108, to preserve the context of the text 104 and other content elements of the set 108.

Accordingly, in some embodiments, using techniques described in detail below, a selection facility may analyze the web page 100, including by analyzing markup elements and/or a layout of the web page 100, to determine content conceptually related to the text 104. More specifically, the selection facility may determine from the position of the cursor 102 that text 104 is a first content of interest to the user and may then determine, from an automatic analysis of web page 100, that the set 108 is conceptually related to the text 104 or otherwise is arranged in a way that indicates a publisher of the web page 100 may have desired for the set 108 to be viewed together. As illustrated in FIG. 1B, the set 108 may then as a group be emphasized, including by visually separating the set 108 from surrounding content together, as a unit. In the example of FIG. 1B, the set 108 is visually separated together via a border 110 that surrounds the set 108. As described in detail below, an emphasis facility may edit the web page 100 to insert new markup elements describing the border 110, or modify existing markup elements in a way that creates the border 110.

Through operating a selection facility and an emphasis facility in accordance with the example of FIG. 1B, a first visible content element (e.g., text) of interest to a user may be emphasized in context with other visible content elements that are related to the first visible content element. It should be appreciated that the border illustrated in FIG. 1B (and in FIG. 1A) is only one example of a type of emphasis that may be applied in embodiments. In some embodiments, as discussed above, other types of emphasis may be used, including highlighting, changes in font properties, and/or magnification of content.

Figure 1C:
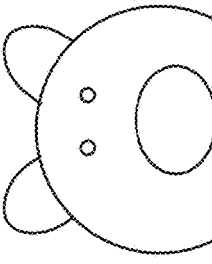
Figure 1D:
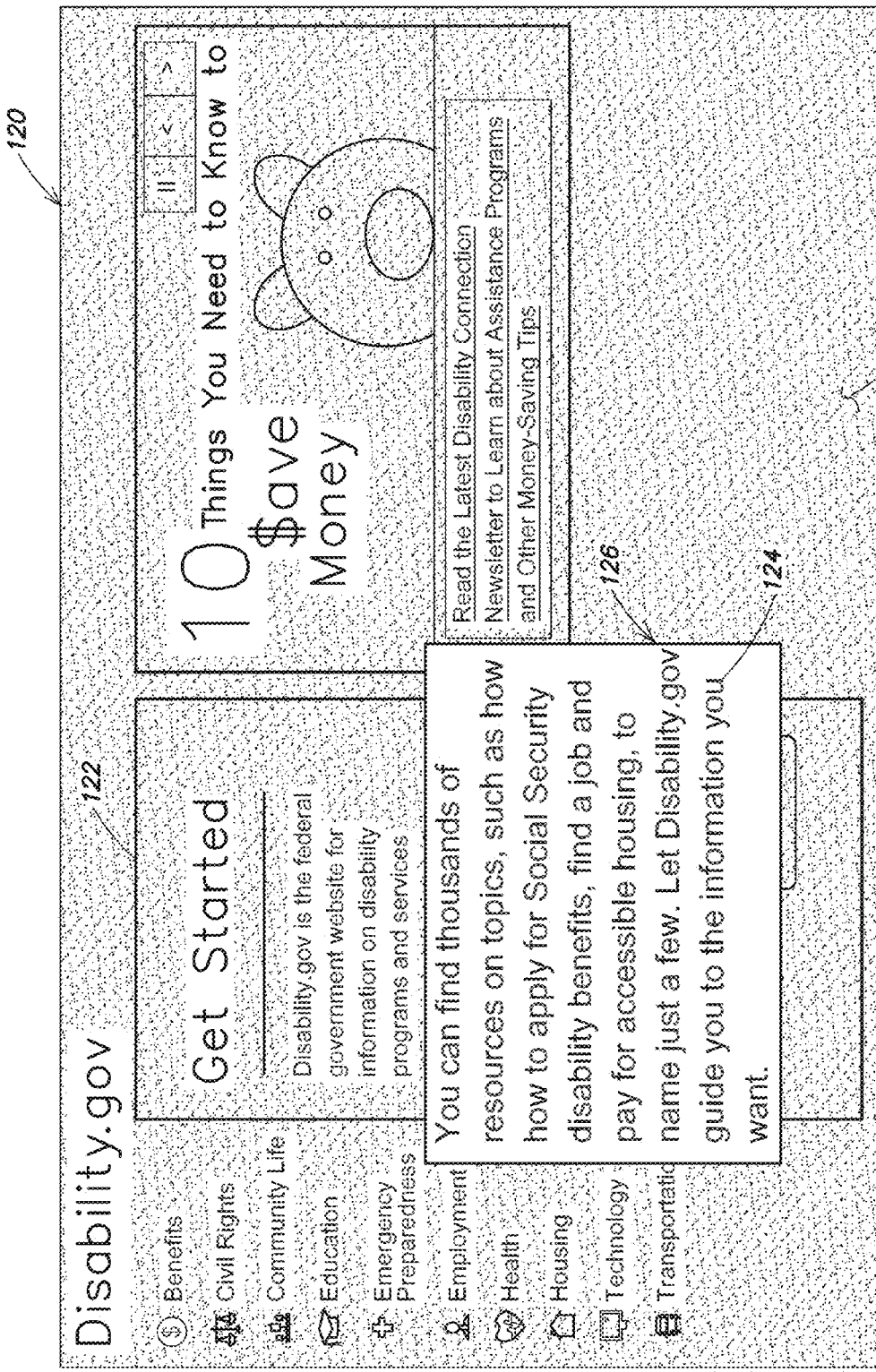

FIGS. 1C-1D illustrate an example of a magnification that may be used in some embodiments. FIG. 1C shows a web page 120 that includes visible content elements including text and photos. Web page 120 includes a box 122 that includes a set of text and pictures, including a paragraph 124. In the case of FIG. 1C, a user may indicate an interest in paragraph 124 and a selection facility may identify that it is content that should be emphasized alone, rather than together with other content of web page 120. This may be because, while paragraph 124 is included within box 122, box 122 may be too large or includes too many other content elements to take as a distinct set of content to be emphasized together. It should be appreciated that while it may be helpful at times to emphasize content in context, emphasizing a content element along with too many other content items may be the same as not emphasizing the content element at all, as the content item may still be difficult for a user to perceive among the other content elements selected with it. Accordingly, in the case of box 122, a selection facility may determine that the paragraph 124 is to be emphasized in isolation, rather than along with all of the other content elements of box 122. Subsequently, the paragraph may be emphasized as illustrated in FIG. 1D.

In the example of FIG. 1D, an emphasis facility has edited the web page 120 to emphasize the paragraph 124 that was determined to be of interest to a user and visually separate the paragraph 124 from surrounding content. The edited web page 120 includes the text 124 that, in the original web page 120, was included at a smaller size and within the block 122 along with the other text. In the edited web page 120, however, the text 122 has an increased text size relative to the other text of block 122, which is shown in the same default size. The web page 120 has also been edited to allow the text 124 to expand beyond its original position, to overlap with other image content that was previously positioned to the right of the block 122. The web page 120 was also edited to display the text 124 within a new graphic area 126 that has a border and a background color that is different from the original background color of block 122. Another graphic element 128 (or more than one graphic element) has also been added to de-emphasize all content other than the text 124, through "graying out" the other content elements, which emphasizes the text 124 even more. Each of the edits made to the web page 120 may be made through editing markup elements of the web page 120, including by modifying existing markup elements and/or inserting new markup elements. Through these edits, the text 124 appears to have been excerpted from the web page 120 and displayed floating above the remaining content of the web page 120, simulating in a way a "lens" effect that may be achieved through traditional magnification technologies.

Specific techniques for selecting content to be emphasized and for editing a markup language document to emphasize that selected content are described below. It should be appreciated, however, that each of the examples below are merely illustrative of embodiments and that other embodiments are possible.

Figure 2:
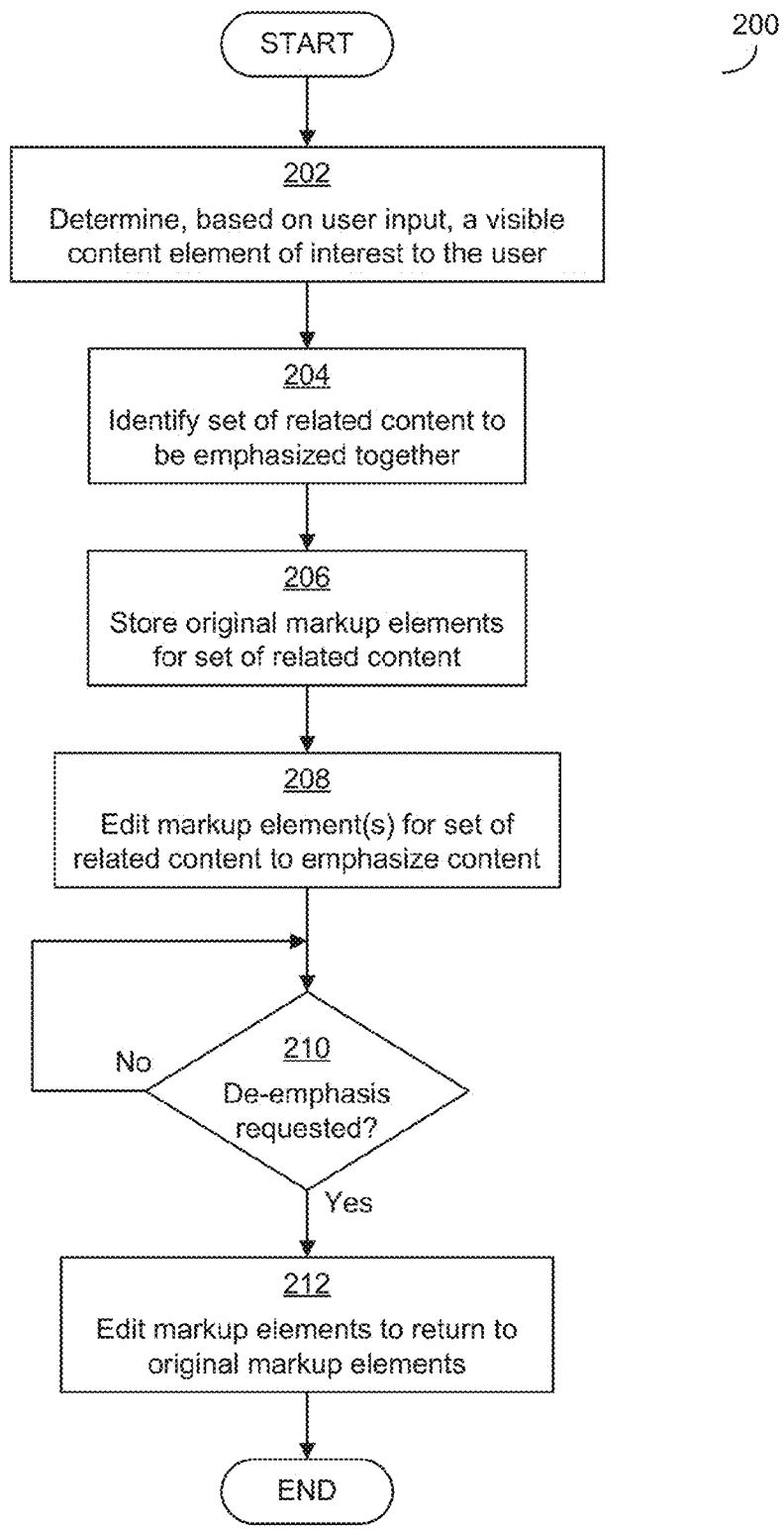
FIG. 2 is a flowchart of an illustrative process for selecting visible content elements to emphasize and for editing a markup language document to emphasize the visible content elements, which may be implemented in some embodiments.

FIG. 2 illustrates an example of a process by which a markup language document may be edited to emphasize and subsequently de-emphasize a portion of the markup language document, including by changing a manner of display of some visible content elements of the markup language document. The process 200 may be implemented by one or more facilities, which may be implemented in any suitable manner including as executable instructions incorporated into the markup language document, such as in scripting language code. In the description of the process 200 below, a selection facility and an emphasis facility are described as implementing parts of the process 200, but it should be appreciated that the division of tasks between facilities is merely illustrative and is not intended to be limiting. Tasks may be divided between any one, two, or more facilities in any suitable manner in embodiments.

Prior to the start of the process 200, a viewing application (e.g., a web browser) may respond to user input by downloading a markup language document, such as by responding to user input of an address (e.g., URL) by sending a request to that URL and downloading a markup language document available at that URL, using known techniques. Subsequently, the viewing application may use known techniques to process the markup language document, such as by processing the markup elements describing visible content elements of the markup language document and rendering/displaying the visible content elements in a display area of the viewing application. As part of processing the markup language document, the viewing application may execute executable instructions incorporated therein. Those skilled in the art will appreciate that executable instructions may be incorporated into a markup language document in a variety of known ways, including by being disposed in the markup language document or by being referenced by markup elements disposed in the markup language document. The process 200 begins following the processing of the markup language document to display the visible content elements and execution of the instructions set forth therein, some of which may describe the process 200 and cause the viewing application to carry out the process 200.

The process 200 begins in block 202, in which a selection facility determines a visible content element of interest to a user based on input from the user. The user input may be any suitable user input, as embodiments are not limited in this respect. For example, the user input may be a selection of a visible content element, such as clicking and dragging a cursor of a pointing device. As another example, a user may click on the visible content element using a pointing device or tap or otherwise "touch" (including "touch and hold") the visible content element using a pointing device that is a touchpad, touchscreen, or other touch interface. As still another example, a user may use keyboard keys to toggle a selection between visible content elements, such as using a "tab" key or spacebar to iterate through visible content elements of the markup language document to indicate a content element of interest. As yet another example, the user may move a cursor of a pointing device to hover over a visible content element to indicate interest in that visible content element. In cases in which a particular content element is determined from a position of a cursor or a position of a touch, known techniques may be used to translate a coordinate into a particular content element. For example, known JavaScript functions such as "elementFromPoint( )" may be used. As another example, some web browsers may automatically track the content element over which the cursor is currently positioned, and the content element may be identified at a time by requesting that information from the web browser (or other viewing application).

In examples below, for ease of description the hovering cursor may be described as the manner in which a user indicates interest in a visible content element, but it should be appreciated that embodiments are not so limited and each of these other examples or other ways of indicating interest via user input may be used.

In block 204, in response to the user indicating interest in a particular visible content element, the selection facility may determine whether that visible content element is included in the markup language document in a set of related visible content elements, such that the set of visible content elements should all be emphasized together to emphasize the content element indicated in block 202 in context. As discussed above, the set of related visible content elements may be visible content elements that are conceptually related, or otherwise form a distinct set in the markup language document that is distinct from surrounding content elements. When the visible content element indicated in block 202 appears in such a set of elements that are conceptually related or are otherwise distinct from surrounding content, the user may wish to view the set of content together or a publisher of the markup language document may have intended for the set of content to be viewed together. In such cases, it may be best to emphasize the set of content together and, as such, the selection facility may determine in block 204 whether the content element in block 202 appears in such a group. The selection facility may make the determination of block 204 in any suitable manner, including according to examples described below in connection with FIGS. 3-6.

In block 206, for the set of content elements identified in block 204 (which may be only the content element indicated in block 202, or the content element of block 202 along with related content elements), an emphasis facility stores original markup elements describing the visible content elements of the set. The markup elements that are stored in block 206 may be the markup elements that define or otherwise describe the visible content elements of the set, such as by describing the content elements themselves, the formatting of the content elements for display, the position(s) at which the content elements should be displayed, or any other suitable markup elements. The original markup elements are stored in block 206 because, through the process 200, the emphasis facility will edit the markup elements to change a manner of display of the visible content elements of the set to emphasize the content elements. Subsequently, such as after the user has viewed the content elements in the emphasized form, the user may wish to de-emphasize the content elements, after which the user may go on to view other content of the markup language document and other visible content elements may be emphasized. As part of de-emphasizing the content elements, the emphasis facility may undo the editing that was done to the markup language document. The emphasis facility may not have any prior knowledge, before the beginning of the process 200, about the markup language document or the particular set of visible content elements to be emphasized, since the emphasis facility may be unrelated to the markup language document and may be reusable between markup language documents. To undo the editing performed on the markup language document, then, the emphasis facility may need to additionally edit the markup language document according to the original markup elements, to remove previously-inserted markup elements and modify previously-existing markup elements to return them to the form indicated by the original markup elements. Alternatively, the emphasis facility could remove all markup elements relating to the set of visible content elements and then insert the original markup elements. In either case, the emphasis facility uses information regarding the original markup elements and thus stores the original markup elements in block 206.

In block 208, the emphasis facility edits the markup language document to emphasize the set of visible content elements. As should be appreciated, any suitable form of emphasis may be used, as embodiments are not limited in this respect. In some embodiments, the emphasis may be done to improve visibility of the visible content elements of the set. Improving the visibility may include visually separating the visible content elements from surrounding content, to make the visible content elements easier to view as a distinct set for users with difficulties with their eyesight. Visually separating the visible content elements may include highlighting the visible content elements, such as by adding a new line as a border or by adding a new background image (e.g., a solid color graphic) that is different from a background of surrounding content. Improving the visibility of the content may also include changing a color or typeface of text content, such as by changing a color to have greater contrast with a background color or by changing a typeface to one that is easier to perceive than an original typeface. As still another example, spacing of content may be adjusted or layout may be adjusted in any other way to make the visible content elements easier to view. As yet another example, the set of visible content elements may be displayed with an increased size relative to a default display size. Each of these examples may be used alone or in any suitable combination with each other or with other ways of emphasizing content, as embodiments are not limited in this respect. Examples of ways in which an emphasis facility may emphasize content elements are described below in connection with FIGS. 7-10.

In block 208, the emphasis facility performs the emphasis by editing the markup language document to change a manner of display of the visible content elements of the set. Prior to the editing, the markup language document may not include markup elements describing the emphasized form of the visible content elements or the emphasized form of any other visible content element of the markup language document. The emphasis facility edits markup elements relating to the set of visible content elements by inserting new markup elements describing new formatting to be applied and/or modifying existing markup elements to change the description of formatting provided by those existing markup elements.

As should be appreciated from the foregoing, including the examples of FIGS. 1A-1D, while the emphasis facility edits the markup language document to emphasize the set of content identified in block 204, the emphasis facility may not edit other content elements or a display manner of other content elements. Instead, the emphasis facility may maintain the default manner of display for the other content elements of the markup language document as described by the original, unedited markup language document. In some embodiments, the emphasis facility may insert a new visible content element that is disposed on top of other visible content elements, such as a new partially-transparent graphic that effectively "grays out" the surrounding content. The new partially-transparent graphic may be specified in any suitable manner, including via an image added to the markup language document or by setting a formatting of an element (e.g., a "div" element), that is newly-inserted or was previously included in the document, to include a partially-transparent color as a background or as another attribute. This new visible content element may be separate from the other, original visible content elements of the markup language document that surround the set of visible content elements being modified. Accordingly, in embodiments in which the partially-transparent graphic is added, the addition of the new partially-transparent graphic may not involve editing of the markup elements related to the other, original visible content elements surrounding the set being emphasized. As such, in some embodiments markup elements relating to the other, original visible content elements may not be modified during emphasis of visible content elements of the set.

Though, as discussed below in greater detail, in some embodiments a change made to markup elements for the set of visible content elements to emphasize one or more the set of visible content elements could affect a manner of display of other, surrounding content elements. For example, a change to a position of one visible content element of the set as part of the emphasizing may trigger a change to a position of a second visible content element outside the set that, unless counteracted, may undesirably change the position of the second visible content element. Other changes to markup elements for the set to be emphasized may also undesirably impact surrounding visible content elements. Accordingly, in some cases, changes may be made to markup elements for other visible content elements that are not to be emphasized to preserve a default manner of display of the other visible content elements.

Following the editing of block 208, the viewing application in which the markup language document is displayed updates the display of the markup language document and, in accordance with the edited markup elements, displays the set of visible content elements in the emphasized format. The updating of the display by the viewing application may be performed automatically by the viewing application in some cases, such as according to a regular update interval, while in some embodiments the emphasis facility may trigger the updating by communicating a request for updating to the viewing application.

At some time following the editing of block 208, the user may request that the emphasis be removed. For example, the user may view the set of visible content elements in the emphasized format and, having viewed that content, desire to view other content of the markup language document, such as by viewing that other content in an emphasized form. As such, the user may provide input requesting that the emphasis be removed. The user input that is received may be any suitable user input, including any of the examples of user input described in connection with block 202. In some cases, for example, the user input may be a user input that indicates another visible content element, such as moving a cursor of a pointing device away from the visible content element indicated in block 202 and over another element. As another example, the user input may be a keyboard entry, such as an "escape" key or spacebar input that the emphasis facility detects as a request to end the emphasis, or another keyboard entry (e.g., a directional arrow input, a page up/down input, or another input) that indicates a selection of a next content element. In block 210, the emphasis facility detects whether such input has been received. If not, the emphasis facility loops back and waits for the user input. If the user input has been detected, however, then in block 212 the emphasis facility edits the markup language document again to change the markup elements for the set of visible content elements that were emphasized. The edits made by the emphasis facility in block 212 undo the edits made in block 208. As discussed above in connection with block 206, in block 212 the emphasis facility uses information regarding the original markup elements stored in block 206 to restore markup elements describing the set of visible content elements to their original form. In cases in which markup elements relating to other, surrounding visible content elements were made to preserve the original formatting of those other elements, as described above, information stored in block 206 regarding these other visible content elements may also be used by the emphasis facility to restore the markup elements for those other visible content elements to their original form. The visible markup elements, following the editing of block 212, will be restored to the default formatting for each of the visible content elements. In some embodiments, the editing of block 212 may result in markup elements that are identical to the markup elements prior to the beginning of the process 200.

Following the editing of block 212, the process 200 ends. As a result of the process 200, a manner of display for one or more visible content elements has been changed from the default to another manner of display which may be easier for some users to view, and subsequently returned to the default manner of display. Following the process 200, a user may indicate a new visible content element and the process 200 may be repeated for a new set of one or more visible content elements, to emphasize (and subsequently de-emphasize) those other visible content elements and make those other visible content elements temporarily easier for some users to view.

As should be appreciated from the foregoing discussion, there are a number of ways in which a selection facility may determine whether a particular visible content element is a member of a set of related visible content elements (e.g., as in block 204 of FIG. 2) and a number of ways in which an emphasis facility may edit a markup language document to emphasize a set of one or more visible content elements (e.g., as in block 208 of FIG. 2). Illustrative examples of ways in which these functions may be performed are described below.

As discussed above, a selection facility may analyze a markup language document to determine whether a particular visible content element, such as one indicated by user input, is a member of a set of related visible content elements. The selection facility that performs the analysis may be independent of any particular markup language document and may therefore perform an analysis that is independent of any particular markup language document, but instead may consider the same factors or other information across multiple different markup language documents available from multiple different publishers of markup language documents. Though, in some embodiments, a publisher of a markup language document (e.g., a web developer or other author of a markup language document) may wish to configure his or her markup language document to influence the analysis performed by the selection facility. Accordingly, in some embodiments, as part of determining whether a visible content element is a member of a set of related visible content elements, the selection facility may examine the markup language document for configuration information that may indicate whether the visible content element is a member of a set.

Figure 3:
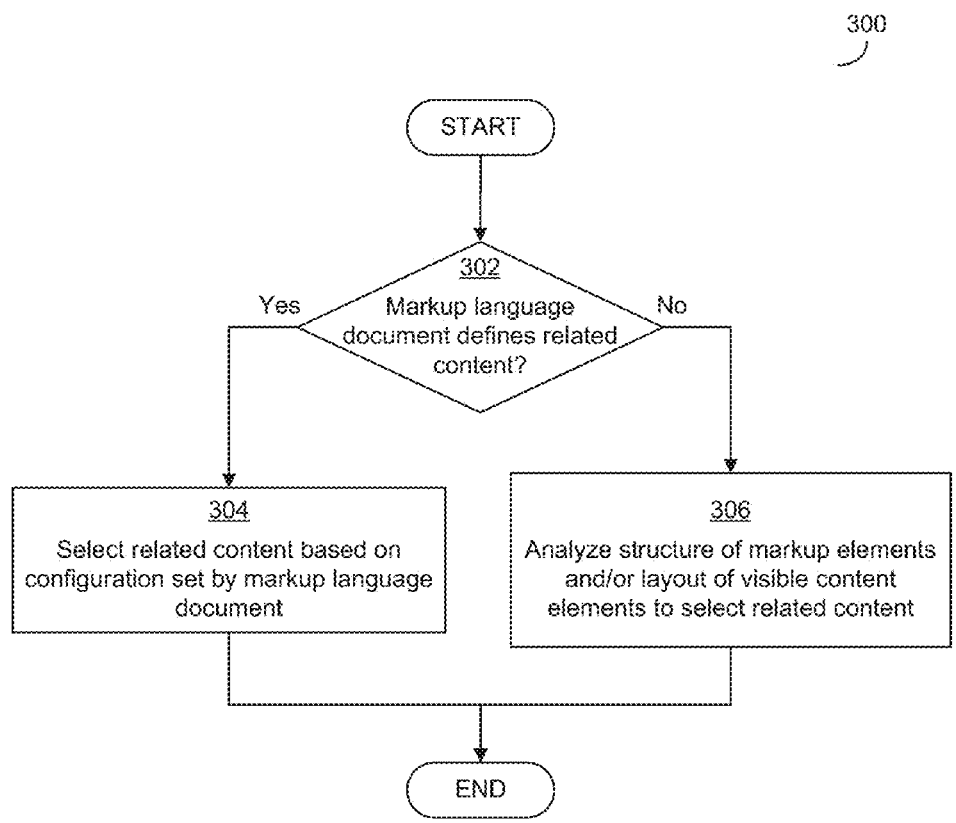
FIG. 3 is a flowchart of an illustrative process for determining how to select visible content elements, which may be implemented in some embodiments.

FIG. 3 illustrates an example of a process by which a selection facility may analyze a markup language document to determine whether it includes configuration information indicating how a selection process should be carried out for a particular visible content element. Prior to the start of the process 300, a markup language document is processed by a viewing application and displayed, and user input is received by a selection facility indicating one visible content element in which a user may be interested.

The process 300 begins in block 302, in which the selection facility determines whether the markup language document includes information defining how related content should be selected. The information may be in any suitable format, as embodiments are not limited in this respect. In some embodiments, for example, configuration information may be included in a configuration file referenced by the markup language document, which may indicate a particular set of content elements or attributes of content elements that are to be selected when a selection process is carried out. For example, a web developer that created a markup language document may have segmented the content of the markup language document into distinct sets using a table arrangement in which each cell of the table is identified using an HTML "td" element. Each table cell may include one or more visible content elements. The configuration file may specify that, when any visible content element is being analyzed, the corresponding "td" element for the table cell in which that visible content element is positioned should be selected and used to specify the set of related content. That is, the corresponding "td" element should be identified, and all of the visible content within that "td" cell should be identified as the set of related content. Through this information set out in the configuration file, the selection file may carry out a relatively simple analysis of the markup language document as compared to examples below: the corresponding "td" element is identified and all visible content included therein are selected for inclusion in the set (or the "td" element is selected as the element defining which visible content elements are included in the set, which are all the visible content elements included within that "td" container). As another example, the configuration file may identify attributes that have been appended to markup elements defining the elements that are to be selected. The configuration file may specify, for example, that a customized attribute (e.g., a custom "selectThisOne" attribute) has been set as "True" or otherwise set on some markup elements. When the selection facility is determining whether there is related content for a first visible content element, in this example, the selection facility examines the markup language document for whether there is an element describing a container that includes the first visible content element and has the customized attribute. If so, that element should be selected and used to identify the set of related content, which would be all the visible content elements included within that container. As a similar example of a configuration file describing attributes, pre-existing, standardized attributes rather than customized ones may be used. For example, the Web Accessibility Initiative's Accessible Rich Internet Applications (WAI-ARIA) project describes a standard set of metadata that may be added to markup language documents to define how the markup language document is arranged, which may be useful to accessibility programs that are attempting to automatically analyze the markup language document. The configuration file may explain that WAI-ARIA content is used, or explain which WAI-ARIA metadata should be used by the selection facility to identify a set of related content. For example, the configuration file may look for WAI-ARIA attributes that identify a WAI-ARIA "region" and select the visible content elements within that "region" as the set of related content.

In other embodiments, rather than being included in a configuration file or otherwise separated within the markup language document, the selection facility may determine whether configuration information is disposed within the markup elements of the markup language document. For example, the selection facility may be configured to use WAI-ARIA metadata where available and thus may examine the markup language document for whether it includes WAI-ARIA metadata.

If the selection facility determines in block 302 that the markup language document includes configuration information defining how related content is to be selected, then in block 304 the selection facility selects related content based on the configuration information in the markup language document. As described briefly above, this may include identifying based on the configuration information a markup element in the markup language document that defines a group of content that includes a first visible content element (e.g., one indicated by user input) and that may include other visible content elements related to that first visible content element.

If, however, the selection facility determines in block 302 that the markup language document does not include configuration information relating to the selection process, then in block 306 the selection facility proceeds by performing an automated analysis of the markup language document. The selection facility performs the automated analysis to determine whether the markup language document includes other visible content elements that are related to a first visible content element (e.g., one indicated by user input). The automated analysis may include evaluating a structure of markup elements of the markup language document and/or a layout of visible content elements as defined by the markup elements. As a result of the automated analysis, the selection facility may determine whether the first visible content element is to be selected alone or if it is to be selected along with one or more other visible content elements.

Once the set of visible content elements to be selected is determined in either block 304 or block 306, the process 300 ends. As a result of the process 300, a set of related content has been selected, which may include a single visible content element that was indicated by user input or may include that single visible content element along with other visible content elements that are related to the single visible content element. Following the process 300, an emphasis facility may edit the markup language document to change a manner of display of those visible content elements to emphasize the visible content elements as compared to surrounding visible content elements. The selection facility may aid this process with the selection of related content (if any) for the single visible content element indicated by the user input to enable the emphasis to be applied to that single visible content element in context with other visible content elements.

Figure 4:
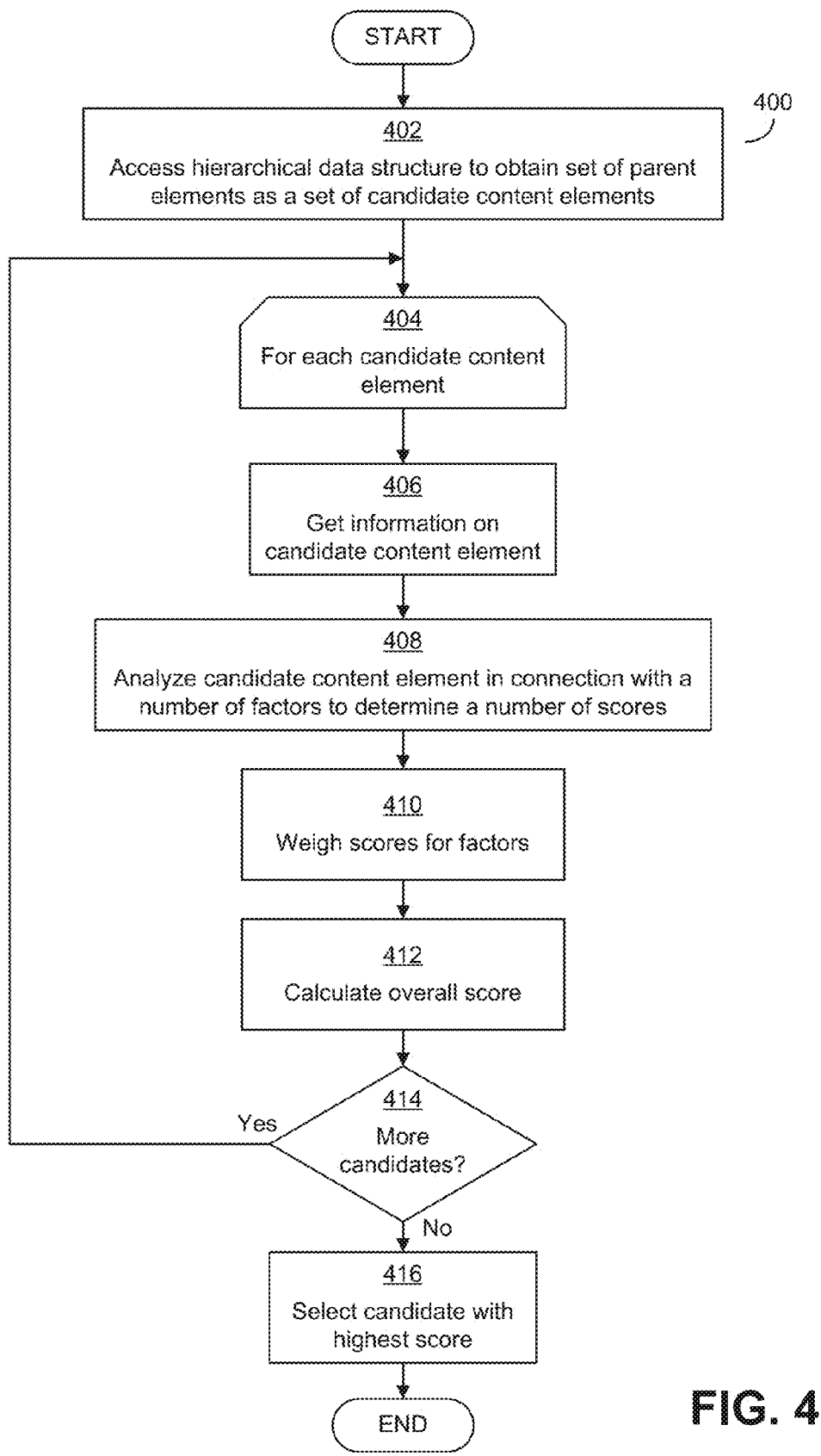
FIG. 4 is a flowchart of an illustrative process for selecting visible content elements, which may be implemented in some embodiments.
Figure 5:
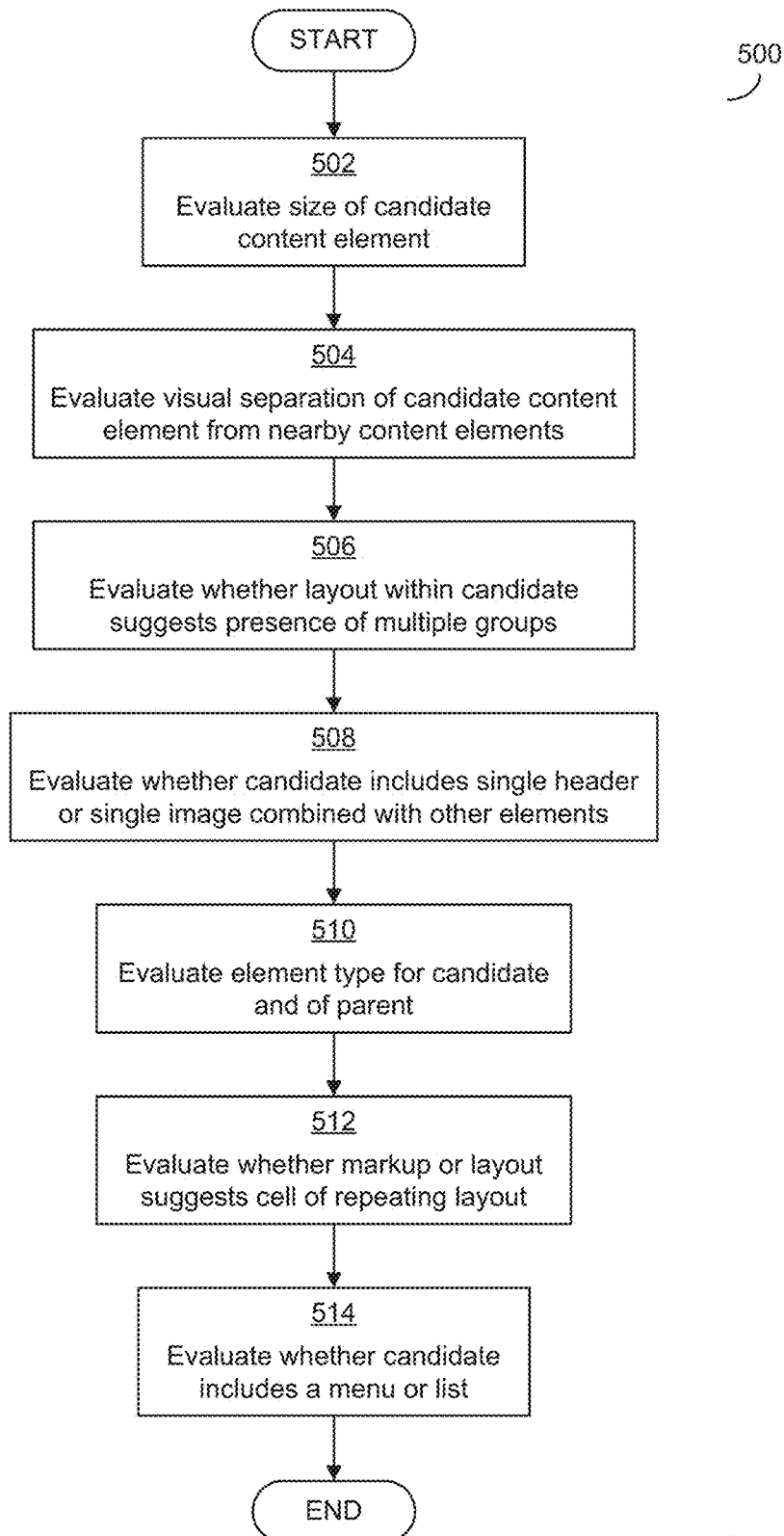
FIG. 5 is a flowchart of an illustrative process for evaluating a candidate content element for selection, which may be implemented in some embodiments.
Figure 6:
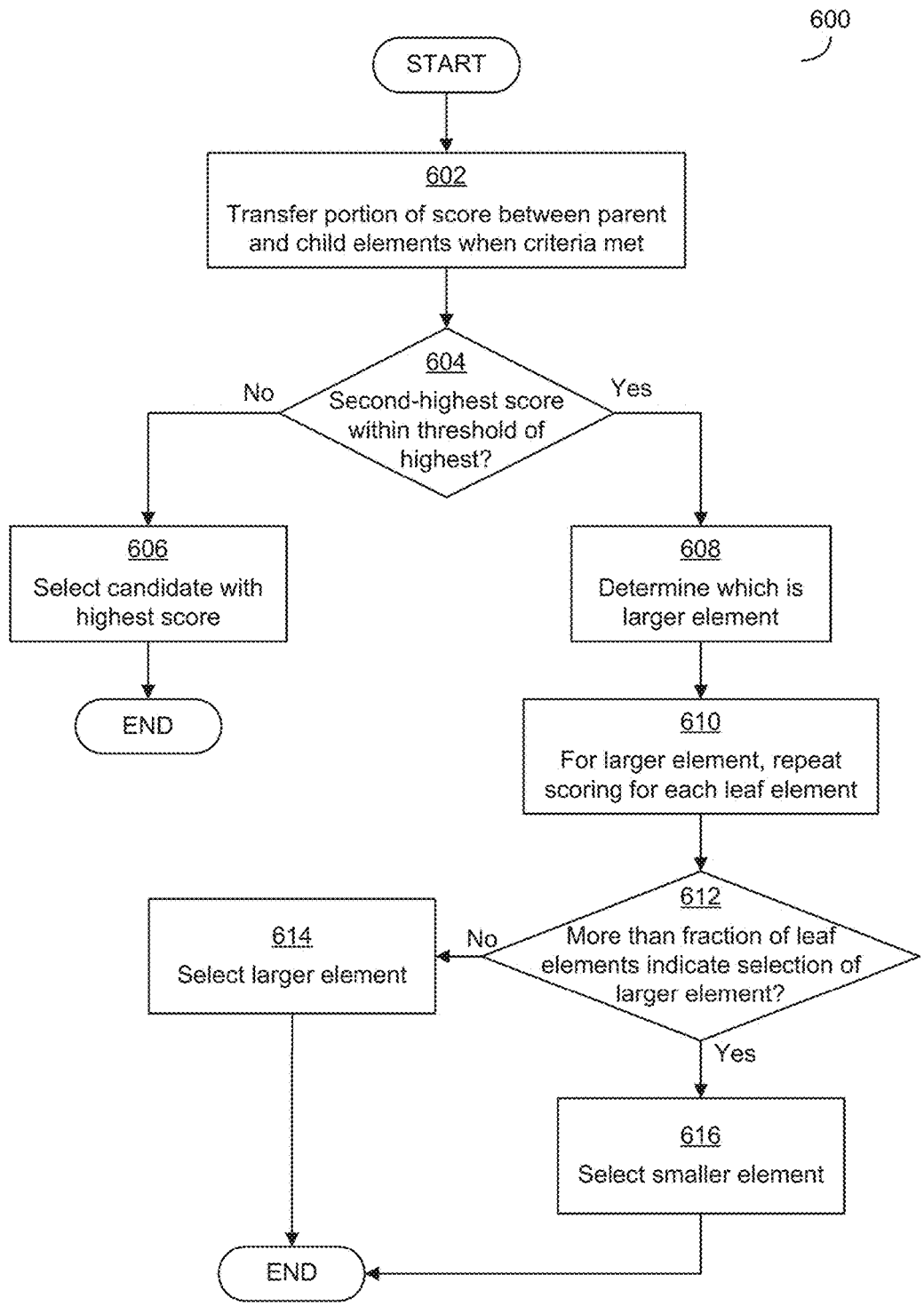
FIG. 6 is a flowchart of an illustrative process for smoothing results of a selection process, which may be implemented in some embodiments.

In embodiments in which the selection facility carries out an automated analysis of the markup language document to determine whether the markup language document includes other visible content elements related to a first visible content element (e.g., one indicated by user input), the automated analysis may be carried out in any suitable manner. FIGS. 4-6 illustrate examples of ways in which the automated analysis may be performed.

It should be appreciated that the automated analysis is carried out because the selection facility is not preconfigured with information regarding the markup language document being identified that relates to how content is laid out or described in the document, or about what content is related to which other content. Prior to the automated analysis, the selection facility may not include any information regarding relationships between content elements of the markup language document to be analyzed. The selection facility may instead be configured with information regarding how publishers of markup language documents typically arrange related content and/or how users typically view content of markup language documents or identify related content. The information may relate to a layout of content in the markup language document or a structure of markup elements in the markup language document.

In some embodiments, the selection facility may carry out the automated analysis to identify a best "container" of content elements to select. Those skilled in the art will appreciate that markup elements of a markup language document are arranged hierarchically, with "parent" markup elements at one level of the hierarchy containing "child" markup elements that are arranged lower in the hierarchy and within the "parent" markup elements. The content elements of the markup language document are arranged similarly, with content elements (visible or not) described by markup elements at one level of the hierarchy containing content elements (visible or not) described by markup elements lower in the hierarchy. The hierarchy of content elements can thus be considered a hierarchy of containers. When a visible content element is identified by user input, the selection facility may identify the position in the hierarchy of that visible content element and then identify each of the containers for that visible content element in the hierarchy. Each of the content elements identified in this way may then be evaluated in the automated analysis to determine whether they best represent a set of related visible content elements. One content element is selected from that analysis, which may be either the visible content element indicated by the user input or one of the containers located above the visible content element in the hierarchy. If one of the containers is selected, then the visible content elements of that container are identified as the set of related content elements.

FIG. 4 illustrates an example of such a process for automated analysis of content elements defined by a hierarchical arrangement of markup elements. Prior to the process 200 of FIG. 4, a viewing application may download and process a markup language document into which is incorporated a selection facility, and execute the selection facility. The selection facility may receive an indication of a first visible content element of that markup language document, which may be received via user input as discussed above.

The process 400 begins in block 402, in which the selection facility accesses a hierarchical data structure containing information regarding content elements of the markup language document. The hierarchical data structure may be any suitable hierarchical data structure, including one maintained by the viewing application. For example, in some embodiments the hierarchical data structure may be a Document Object Model (DOM) containing information on content elements described by markup elements of the markup language documents. A hierarcy of the DOM may match a hierarchy of the markup elements, with some content elements arranged as "children" of other content elements within the hierarchy of the DOM when the corresponding markup elements are nested inside one another.

In block 402, the selection facility accesses the hierarchical data structure to identify the node in that structure that relates to the first visible content element that was identified as being of interest to the user (e.g., based on user input). After identifying the node in that structure for the first visible content element, the selection facility may determine the nodes for a chain of parent content elements of the first visible content element extending up the hierarchy. The selection facility may identify all parent elements in a chain extending all the way up the hierarchy, or may identify any suitable number of parent elements that is less than all. In some embodiments, it may be advantageous to identify only up to a certain number of parent elements to limit the computation that is subsequently performed in the process 400 and increase overall efficiency of the process 400. For ease of description herein, in some cases the chain of parent content elements may be identified as those content elements that are "directly above" the first visible content element in the hierarchy, and it should be appreciated that this phrase does not refer to only content elements in the next level immediately above the first visible content element in the hierarchy.

In some embodiments, in addition to identifying parent elements in the chain, the selection facility may identify child elements in the chain as well, through identifying elements directly below the first visible content element in the hierarchical data structure until the end of the structure is reached.

The set of content elements identified from the hierarchical data structure in block 402 is a set of candidate content elements (some of which may not be visible content elements) that are to be evaluated to determine whether they represent a set of related visible content elements (including the first visible content element and any related content). Based on the evaluation, one of the candidate content elements identified in block 402 will be selected. If the selected candidate content element is the first visible content element (or is another candidate content element that is a container including only the first visible content element and no other visible content elements), then this represents a determination that there are no other visible content elements that are to be selected along with the first visible content element and, for example, emphasized along with the first visible content element by an emphasis facility. If, however, the selected candidate content element is a container including the first visible content element and other visible content elements, then this represents a determination that the first visible content element is a member of a set of related content elements distinct from surrounding visible content elements and that, for example, the related set of visible content elements should be emphasized together as a group by an emphasis facility.

Accordingly, in block 404 the selection facility begins an analysis of each of the candidate content elements identified in block 402. For each candidate content element, the selection facility in block 406 determines information on the candidate content element. The information that is determined may include information on a type of the candidate content element, such as a type of the candidate content element and/or a type of markup element that defined the candidate content element. Information on a size of the candidate content element may also be determined, as well as information on a position at which the candidate content element is to be displayed within a display the markup language document by a viewing application.

Information on a separation of the candidate content element from surrounding visible content elements may be also determined in block 404. The separation may be determined as the amount of space between expressive content elements, including any margins or padding on an expressive content element set based on the formatting of the content element and on any other whitespace (which, as those skilled in the art will appreciate, may or may not be "white") that may exist between the expressive content elements due to positioning of the elements. The separation may be determined for each of the four sides of the candidate content element on a two-dimensional screen.

In some embodiments, visual separation may be evaluated in connection with criteria related to a manner in which humans typically perceive groups of content. For example, criteria may be developed based on psychological research regarding human perception of groups of content, such as based on Gestalt Laws of Grouping. In connection with these criteria, a selection facility may evaluate distances separating visible content elements and other factors that relate to perceived groupings of content.

Separation may be determined for candidate content elements in block 404 based on expressive content elements, whether or not the candidate content element is an expressive content element. Expressive content elements may be a text element, image element, or other type of visible content elements that convey information to a viewer (or may convey, given that an image may, in some cases, merely be a solid color box), as opposed to content elements that are not visible or that are visible but merely serve as layout elements such as borders or lines. In the case that the candidate content element is an expressive content element, the separation may be the distance on each side from the boundary of the expressive content element to another expressive content element, without taking into account intervening non-expressive content elements. Alternatively, in the case that the candidate content element is not an expressive content element, then the separation may be determined based on expressive content elements contained within the non-expressive content element. For example, if the candidate content element is not itself an expressive content element but contains an assortment of expressive content elements, then the separation may be determined for each of the four sides of the non-expressive content element based on the expressive content element within the non-expressive content element that is closest to that side. More specifically, for the left side of a non-expressive content element, the separation may be determined by identifying the expressive content element within that non-expressive content element that is closest to the left side, determining that left-hand separation for that expressive content element, and using that determined separation as the left-hand separation for the non-expressive content element. A similar process may be repeated for the other three sides of the non-expressive content element.

While the information-gathering step of block 406 is shown in the example of FIG. 4 as included within the loop of block 404 and carried out for one candidate content element at a time, it should be appreciated that embodiments are not so limited. In some other embodiments, the selection facility may gather the information of block 406 for all candidate content elements at once, to efficiently gather the information once for all candidate content elements for subsequent analysis.

In block 408, once the selection facility retrieves the information on the currently-selected candidate content element of the loop of block 404, the selection facility evaluates the information for the candidate content element in connection with a number of factors. The selection facility is not limited to evaluating any particular factors in its analysis and examples of factors are discussed in greater detail below in connection with FIG. 5. The factors that may be analyzed may be factors that are indicative of whether the candidate content element represents a distinct set of content that is distinct from surrounding content. Such a distinct set of content may be content that is conceptually related or that a publisher of the markup language document otherwise intended a viewer to view together as a set. For example, a separation for the candidate content element may be evaluated because a group of content elements that are more separated from surrounding content elements may be more likely to be a distinct set or otherwise intended to be viewed together. This is because it is common for publishers of markup language documents to separate from surrounding content a group of content that should be viewed together. Similarly, a layout of each candidate content element may be evaluated to determine whether it is visually separated from surrounding visible content elements in a way that suggests it is distinct, such as by including a different background from surrounding visible content elements. As another example, a structure of markup elements defining the candidate content element and markup elements that are adjacent in the markup language document may be evaluated to determine whether the markup elements indicate a repeating layout of cells in one or more columns and/or one or more rows. In this case, the candidate content element that represents a single cell of that repeating layout may be best to select as a distinct set of related content.

Each of the factors that is scored in block 408 may be associated with a weight. The weight may indicate a relative importance toward selection, with positive, higher-value weights indicating that a factor weighs heavily in favor of that candidate content element being selected. Some weights may be negative, where a factor influences the selection facility toward not selecting a candidate content element. Once the scores for a candidate content element are calculated in block 408, in block 410 the selection facility weights the scores and, in block 412, processes the weighted scores to calculate an overall score for the candidate content element. The selection facility may weight the scores and process the weighted scores in blocks 410, 412 in any suitable manner, as embodiments are not limited in this respect. In one embodiment, the facility may multiple the scores by corresponding weights for factors and then sum the weighted scores. In other embodiments, other mathematical calculations may be used. In still other embodiments, a neural network of inputs may be used to calculate an overall score based on scores for factors.

In block 414, the selection facility determines whether more candidate content elements are to be evaluated in the loop of block 404 and, if so, continues through the loop with the next candidate. Once emphasis facility determines in block 414 that the loop of block 404 has been performed for each candidate content element and the selection facility has calculated an overall score for each candidate content element, in block 416 the selection facility chooses the candidate content element having the highest score. As discussed above, the candidate content element may, in some cases, be the first visible content element that was identified (e.g., from user input) as being of interest to a user. The candidate content element may alternatively, in some cases, be another content element that may be a container for the first visible content element and potentially other, related visible content elements of the markup language document. The selected candidate content element represents an identification of the visible content elements selected by the selection facility, as the visible content elements that are selected by the selection facility to be, for example, emphasized by an emphasis facility will be those visible content elements that are disposed within the selected candidate content element in the hierarchical data structure that was accessed in block 402.

Once a candidate content element is selected in block 416, the process 400 ends.

As discussed above in connection with block 408, the selection facility may calculate a number of scores for a candidate content element in connection with a number of factors that may be evaluated. FIG. 5 illustrates an example of a process 500 that may be used by the selection facility to implement the scoring of block 408 for each candidate content element within the context of the loop of block 404. It should be appreciated, however, that the example of FIG. 5 is merely illustrative and that other processes and other factors may be evaluated.

The process 500 begins in block 502, in which the selection facility evaluates a size of the candidate content element. The size that is evaluated may be both an absolute size and a relative size to a next candidate content element both up and down in the chain of candidate content elements of the hierarchy. An absolute size for the candidate content element may be the dimensions of the candidate content element, such as the width and height. The width and height may be the default width and height (e.g., in pixels) for the candidate content element, as set out by original markup elements of the markup language document, or may be the width and height (e.g., in pixels) for the candidate content element as manipulated by the viewing application, such as if the viewing application has increased the size of the entire markup language document and, with it, the size of the candidate content element.

The selection facility may evaluate the absolute size in any suitable manner. For example, the selection facility may compare the absolute height and/or the absolute width to thresholds to determine if either the height and/or width are below minimum thresholds and/or above maximum thresholds. If the height and/or width are below minimum threshold or above maximum thresholds, then corresponding size factors may be set to high values, which may then be given negative weights in a subsequent step, to give an effect toward not selecting the candidate content element. There may be thresholds for all content, as well as a special threshold for very wide or very tall images. Wide or tall images may be design elements that, in some embodiments, should never be selected. Standard thresholds for other elements may influence a selection, but leave open the possibility of a candidate content element having sizes above the maximum thresholds or below the minimum thresholds being selected. A significantly high value or a significantly high negative weight may be used to ensure that very wide or very tall images are not selected by the selection facility.

A related analysis may be whether the height and/or width fall within ranges of dimensions that have been identified to be "good" dimensions for potential sets of related content elements. For example, a range of "ideal width" for a candidate content element may be determined to be between 20 percent and 85 percent of the width of the display area of the viewing application (e.g., viewport of a web browser) and a range of "ideal height" for a candidate content element may be determined to be between 25 percent and 60% of the height of the display area. In the case that the height and/or width of the candidate content element falls within the ideal ranges, high values may be given to one or both of these scores, and positive weights may be associated with the factors, to influence the selection facility toward selecting the candidate content element. In the case that a height and/or width falls outside of the ideal range, scores for factors of "percentHeightOverIdealMax", "percentWidthUnderIdealMin," and "percentWidthOverIdealMax" are calculated as the difference between the percentages of the height/width of the candidate content element relative to the display area of the viewing application and the ideal height/width percentages given above.

In the case that a criteria for one of the size factors is not met, or any other criteria for other factors described below, is not met and is thus inapplicable to a candidate content element, the factor is assigned a score of 0.

In addition to evaluating an absolute size of the candidate content element in block 502, a relative size of the candidate content element may also be evaluated. The relative size that is evaluated may be the relative size between the candidate content element and a parent or a child content element (for which information may be available because these elements are also in the chain and being analyzed as candidate content elements). The relative size may measure growth of the candidate content element versus the parent or child element. Some types of growth may be good indicators that the candidate may be better to select than a parent or a child, while other types of growth may indicate that the candidate is worse. For example, if the candidate content element grows significantly in two dimensions relative to the immediate child, then this is a negative with respect to identifying a group of related content elements, as groups of related content elements typically grow only in one dimension. Significant growth in two dimensions may more clearly signify that a candidate content element is a group of groups of related content, and it would be preferable for the selection facility to select one of those groups instead. Significant growth in this case may be measured versus a threshold, such as more than 30 percent growth horizontally or more than 25 percent growth vertically. In the case that the two thresholds are met, a high score may be assigned to the factor and a high negative weight may be associated.

Large growth (e.g., over the thresholds specified above) in only one direction (horizontal or vertical) may also be disadvantageous, in addition. For example, if a candidate content element is much wider than its immediate child, this may be another sign that the candidate content element is a row of groups of content, and it would be preferable for the selection facility to pick one of the groups. Accordingly, a high score will be assigned to this factor with a negative weight.

In some cases, an amount of growth for a candidate content element over a child may be important based on dimensions of the immediate child. For example, if the immediate child is tall or wide, which may be judged by a height or width above thresholds, growing any amount taller or wider than the already tall/wide child may be undesirable as it may not indicate a group of content that should be selected. In this case, a high value with a high negative weight may be used for this factor.

Moderate growth in only one direction, however, such as growth lower than these thresholds, may be a very good sign. For example, a container for a picture and a caption, or a paragraph and a title may be moderately larger in a vertical direction than the picture or than the paragraph, and it would be best for the container to be selected in either case. Accordingly, in this situation, a high score may be assigned to the factor and a high weight associated. Similarly, if a candidate content element is moderately smaller than a parent in one direction, to encourage the parent that is moderately larger to be chosen the candidate content element will be assigned a high score for a "moderately smaller" factor that has a high negative weight associated.

In block 504, the selection facility may also evaluate the separation of the candidate content element from surrounding visible content elements. The separation may be judged on whitespace, the existence of borders, or other elements of a layout that serve to visually separate the candidate content element from surrounding visible content elements. For example, the separation information relating to space that is collected for a candidate content element (as discussed above in connection with block 406 of FIG. 4) may be used to determine a score for top separation, bottom separation, left separation, and right separation that has a score relative to the separation value calculated for each side. As an alternative, a vertical separation or horizontal separation may be calculated for each candidate content element based on the separation values for top and bottom (for vertical) and left and right (for horizontal) and on whether the candidate content element is adjacent to a border on the top and/or bottom (for vertical) and adjacent to a border on the left and/or right (for horizontal). In some embodiments, to increase the separation score as the amount of whitespace increases, the amount of whitespace in pixels may be raised to the power of 1.3 before being scored.

Separation may also be evaluated by the presence of borders. Regardless of the separation values based on whitespace, if the candidate content element is adjacent to a border the corresponding separation value may be high, as the border creates a stronger visual separation than any amount of whitespace could. In the case of a border, the separation score may be calculated based on the width of the border, such as a score of 10 points per pixel of border width. A border may be detected based on the formatting of the candidate content element, such as where the style information for the candidate content element indicates a border/line is to be applied when the candidate content element is rendered. The border may also be created as a thin image, such as an image that is tall and thin for a vertical border or wide and short for a horizontal border. As another example, the border may be created as a "horizontal rule" element specified by an "hr" HTML tag.

In block 504, the selection facility may also judge a visual separation of the candidate content element based on the background of the candidate content element and whether the background differs from the background of the next parent element of the candidate content element. If the background differs from the parent, this is a strong indication that there is a distinct set of content, as it is common for web developers or other publishers of markup language documents to aggregate distinct sets of content within boxes that would appear as different backgrounds during the automated analysis by the selection facility. In this case, the "has different background" factor would be assigned a high score, and would have a high positive weight.

In block 506, the selection facility may evaluate contents of the candidate content element to determine whether there are contents indicative of the presence of multiple different groups of content within the candidate content element. For example, if there are elements having different background colors within the candidate content element, this is indicative of different groups. Similarly, the existence of borders and lines such as thin images, horizontal rules, or borders and lines established by style of a candidate content element is also indicative of the presence of multiple groups. The existence of multiple section headers, as indicated by multiple elements specified using the HTML tags "h1" through "h6" may also be indicative of the presence of multiple items.

In block 508, the selection facility may evaluate whether the candidate content element (and any descendent content elements, in the hierarchical arrangement of content elements) includes only a single header (as specific by HTML tags "h1" through "h6") potentially coupled with other elements or includes only a single image potentially together with other content. It is common for web content to be arranged as a single image alone or coupled with related text (e.g., a caption or text otherwise explaining the image) or as a single section header alone or coupled with related text or images. In these cases, the presence of a single header or a single image within the candidate content element (and its descendants, if any) is a strong indication that the candidate content element defines a set of related content. Accordingly, in either case the related factor would be assigned a high value and positive weight would be associated.

In block 510, the selection facility may evaluate a type of the candidate content element to determine whether the candidate content element is a "great" element type, a "good" element type, or a "bad" element type, as indicated by the HTML tag that defines that defines the candidate content element. As indicated by the names, a "great" element type may be given a high value or a high weight, a "good" element may be given a moderately high value or high weight, and a "bad" element type may be given a high value or negative weight. Great elements may include those that have been identified as commonly being used by web developers to identify discrete groups of related content (or content that is alone but should be picked alone rather than as a part of a group). For example, block quotation elements ("blockquote"), a cell of a table ("td"), an unordered list of content ("ul"), an ordered list of content ("ol"), or a menu ("menu") may be commonly used by web developers to identify discrete groups of related content and may therefore be great tags. Good elements may be often, but not always, used in ways to identify groups of related content (or content that is alone but should be picked alone rather than as a part of a group). A link ("a") that includes a block of content, a street address ("address"), a button ("button"), a snippet of computer code ("code"), a description list ("dl"), a group of related form controls ("fieldset"), a form as a whole ("form"), a paragraph ("p"), a group of preformatted content ("pre"), a list item ("li"), a section ("section"), a table row ("tr"), or any one of the types of controls of a form may be good tags. Examples of bad elements that are not often used for groups of related content or for discrete content elements include any of the HTML header tags ("h1" through "h6") or a group of headers ("hgroup"). The determination of whether the candidate content element is of a bad type may therefore also be a determination of whether the candidate content element is a heading.

In addition to evaluating the type of the candidate content element in block 510, a type of ancestor (parent, grandparent, etc.) elements may also be evaluated. Some types of content elements may not commonly be used as containers of groups of content elements, and thus it should be uncommon for a descendant (child, grandchild, etc.) of one of these types of elements to be selected. For example, if any one of the ancestor elements of the candidate content element is a list item ("li"), a paragraph ("p"), a header (either "h1" through "h6" or "hgroup"), or is a button ("button"), then the candidate content element should not be selected.

In block 512, the selection facility evaluates the candidate content element to determine whether the layout and/or markup elements of the candidate content element and surrounding content indicate that it is a cell of a repeating layout (e.g., a row, column, or grid of repeating cells). It should be appreciated that, in the context of a repeating layout, a "cell" may be any suitable grouping of content that is repeated, and is not limited to be arranged in a table format or using markup elements related to tables. Any suitable layout or format for repetition may be used and may be analyzed in block 512.

In the case that the markup language document includes a repeating layout of cells, it is often desirable to select one of the cells as the discrete set of related content elements, as web publishers often place related content within a cell and unrelated content in different cells. Users often desire to view an entire cell at one time, as well. Accordingly, in block 512 the selection facility determines whether the candidate content element is of a type that is not commonly associated with cell layouts, such as a paragraph ("p"), link ("a"), or heading ("h1" through "h6"). The selection facility may also determine a number of sibling elements for the candidate content element by accessing the hierarchical data structure describing content elements of the markup language document (e.g., DOM). If the hierarchical data structure indicates that the candidate content element is alone on its level of the hierarchy and has no siblings, there is thus no repeating layout at that level and the candidate content element cannot be determined to be a cell of a repeating layout. For these two factors, a high value and a negative weight may be used. The selection facility may also determine whether a height of the candidate content element is below a threshold associated with cells, such as 25 pixels (e.g., because repeating cells seldom have heights below this threshold). This may be associated with a high value and a negative weight. The selection facility may then determine whether, if the candidate content element has one sibling, if the candidate content element is sharing a horizontal or vertical dimension of the parent element roughly evenly with the other sibling. For example, the selection facility may determine whether the width or height of the candidate content element is between 33 percent and 66 percent of the width or height of the parent. If the two siblings are not sharing the height or width roughly evenly, then it is unlikely that the two elements are cells of a repeating layout. In this case, a high value and a negative weight may indicate the unlikelihood.

If, however, the selection facility finds more than two siblings or two siblings that are sharing a parent's dimensions roughly evenly, then the selection facility may evaluate whether the siblings are arranged in a way that is indicative of them being cells in a repeating layout. The selection facility may determine whether the cells include largely the same tags. If the siblings are not largely the same in content and layout, then it is unlikely that the siblings are part of a repeating layout. In this case, the selection facility may not look for the siblings to be identical, but may look for a threshold level of similarity, such as having an overlap of tags between siblings of 80 percent or more. Sharing 80 percent of their tags or more may be a good sign and be given a high value and a positive weight. The dimensions of the siblings may also be evaluated to determine whether the dimensions of the siblings tend to vary in only one dimension. It is common for cells of a repeating layout to vary in one dimensions, such as width or height, but uncommon for cells to vary in two dimensions. Varying in only one dimension may be assigned a high value and a positive weight, while varying in two dimensions may be assigned a high value and a negative weight. Having precisely matching dimensions, such as exact width or exact height, between siblings may be a strong indicator and assigned a high value and a strong positive weight.

When comparing siblings in the manner described in the preceding paragraph, it may increase efficiency to examine only some siblings, rather than all, as a great number of siblings may increase the computational complexity of the analysis and take a great deal of time. In some embodiments, then, only up to a threshold number of siblings may be evaluated, such as up to five siblings.

Relative dimensions to a parent content element may also be evaluated. If a parent content element has a same width but significantly greater height than a candidate content element, this suggests that the candidate content element may be a cell in a repeating column of cells. Similarly, a parent with an exactly matching height and a significantly greater width may indicate that the candidate content element is a cell in a repeating row of cells.

Web developers may commonly use elements that are set to be "floats" for two reasons: first, to flow text around image elements or other content groups, and second, to create cells of repeating layouts. When a candidate content element is configured as a "float," the selection facility may determine whether that candidate content element is also configured for text to wrap around it. If it is configured for text wrapping, it is more likely that the float is to be used for text wrapping and less likely that it is a sign of a cell of a repeating layout. If, however, it is a float that is not configured for text wrapping, this may be a sign that it is a float that is being used to define a cell of a repeating layout. This may be associated with a high value and a strong positive weight in this case.

In block 514, the selection facility may also evaluate whether the candidate content element is a list of elements, including a menu element such as a menu of links. The selection facility may be configured not to select a horizontal list, including a horizontal menu bar, as it is unlikely that a user will want to emphasize an entire horizontal menu bar together or otherwise select an entire horizontal menu for performance of a task. Accordingly, a list of elements positioned horizontally, especially a wide horizontal list, may be assigned a high value with a negative weight. A vertical list, however, may be assigned a high value as it may be more likely that a user will want to view a vertical list of elements together. A high value with a positive weight may be assigned to containers of lists that are arranged vertically. If each element on the list is a link, then it may be even more desirable to select together, as a user may want to view/emphasize or otherwise process the links together and potentially select one of the links. Accordingly, when the vertical list is a list of link elements ("a" elements), the score determined for the list may be multiplied by a value (e.g., 1.5) to give a bonus score for being a list of links.

After completing the menu or list analysis of block 514, the process 500 ends. As a result of the process 500, a set of scores has been calculated for various factors by which a candidate content element is evaluated. The scores may be combined according to weights to yield an overall score for the candidate content element. The process 500 may also be repeated for each candidate content element of a set of candidate content elements and, as discussed above in connection with FIG. 4, the candidate content element with the highest score may be selected.

It should be appreciated that, as discussed above, that while FIG. 5 illustrates a set of factors that may be evaluated, the factors are merely illustrative. Other factors may be considered, and the factors may be combined in any suitable combination, as none of the factors are necessary. Embodiments are not limited to carrying out any particular analysis of factors for candidate content elements.

In some embodiments, once the factors are scored as in the example of FIG. 5, the scores may simply be multiplied by corresponding weights and summed to calculate an overall score that is used to determine whether a candidate content element is selected by the selection facility. In other embodiments, however, the selection facility may adjust the scores between parent/child candidate content elements as part of selecting a candidate content element, and may also conduct a more detailed analysis of candidate content elements when scores for two candidate content elements are close. Both such processes may be carried out to "smooth" results between different iterations of the analysis process and encourage consistent results.

Process 600 is an example of a process that may be carried out as part of smoothing results. Prior to the start of process 600, a process may be performed for evaluating candidate content elements under a variety of criteria, from which a set of overall scores may be calculated. The process 600 begins in block 602, in which a share of a child candidate content element is transferred to its immediate parent candidate content element when one or more criteria are met. Any suitable criteria may be used, including criteria that, when met, indicate that a parent should be preferred for selection over its child. For example, if a parent candidate content element has only one child, it is likely that the parent should be selected over the child and, as such, a portion of the child's score may be transferred to the parent to encourage the selection facility to select the parent before the child (though a third element with a still-higher score may still be selected by the selection facility, as that relationship is unchanged). For example, 75 percent of the child's score may be subtracted from the child's score and added to the parent's score. As another example of a criterion, when dimensions of a parent candidate content element are only slightly larger than its immediate child, it is again unlikely that the selection facility should correctly select the child element over the parent. To account for this unlikelihood, some portion (e.g., 30 percent) of the child's score may be subtracted from the child's score and added to the parent's score. As a third example, if the parent candidate content element contains only a heading and one other content element (either of which may be the child candidate content element), it is more likely that a correct selection between the parent and the child should be of the parent. Accordingly, a portion (e.g., 75 percent) of the child's score may be subtracted from the child's score and added to the parent's score.

In block 604, the selection facility may compare overall scores for each of the candidate content elements, some of which may have been adjusted in block 602. The selection facility determines in block 604 whether a second-highest score is within a threshold amount of the highest score. The threshold amount may be an absolute number, such as a number of points, or may a relative number, such as a percentage. If the second-highest score is not within the threshold amount, then in block 606 the selection facility selects the candidate content element having the highest score. If, however, the second-highest score is within the threshold amount of the highest score, then the selection facility carries out a tie-breaking process. In the tie-breaking process, in block 608 the selection facility determines which, between the highest-scoring candidate content element and the second-highest-scoring candidate content element, has the larger dimensions. For the larger element, in block 610 the selection facility then identifies as a new set of candidate content elements all of the expressive content elements that are contained within the larger element according to the hierarchical data structure of content elements (e.g., DOM) and that have no child content elements themselves (e.g., are "leaf" elements of the hierarchical data structure). The selection facility may then evaluate each of these expressive content elements within the larger element and the larger element itself using the same evaluation and scoring process previously used for the visible content element indicated by user input. For example, the process 400 of FIG. 4, including the accessing of the hierarchical data structure to identify ancestor content elements as in block 402 and the scoring of each ancestor element, may be performed for each of the expressive "leaf" content elements to determine new scores. For each "leaf" element, the highest scoring candidate content item is identified and evaluated to determine whether it is the candidate content element determined in block 608 to be the larger element. In particular, the selection facility in block 612 determines whether the newly-identified highest-scoring element for each of the "leaf" content elements is the larger element identified in block 608 and whether more than a fraction (e.g., 50 percent) of the highest-scoring element for the "leaf" content elements is the larger element. If more than the fraction of highest-scoring elements for the "leaf" elements are the larger element of block 608, then in block 614 the candidate content element determined in block 608 to be the larger element is selected by the selection facility. If, however, the selection facility determines in block 612 that less than the fraction of highest-scoring elements for the "leaf" elements are the larger element, then in block 616 the candidate content element determined in block 608 to be the smaller element is selected by the selection facility. Once one of the candidate content elements is selected in blocks 606, 614, or 616, the process 600 ends.

While the transfer of scores between parent and child elements and the tie-breaking process were described above as being implemented together, it should be appreciated that embodiments are not so limited. In some embodiments, the parent-child score transfer may be implemented without the tie-breaking process or with a different tie-breaking process. In other embodiments, the tie-breaking process may be implemented without a parent-child score transfer or with a different score transfer process.

In some embodiments that implement a selection process according to some or all of the techniques described in connection with FIGS. 3-6, a single element is selected as the output of each selection process, which represents a set of one or more visible content elements contained within that single element. In some such embodiments, to ensure that a single element is selected, a tie-breaking process such as the tie-breaking process of FIG. 6 may be implemented. It should be appreciated, however, that embodiments are not limited to selecting only one element as the output of the selection process. In some embodiments, one, two, or more elements may be selected. For example, if two or more elements have the same highest score, or have the highest scores and have differing scores within a threshold difference, the multiple elements may be selected. In this case, all of the visible content elements below each of the selected elements may be included in the set of related visible content elements.

Those skilled in the art will appreciate that the selection techniques described above may in some cases be limited and not work well for some markup language documents. The analysis techniques described above include determinations made based on an arrangement of markup elements in the markup language document that follows common arrangements that a markup language document may be expected to follow. For example, one expected arrangement on which some techniques described above are based is that related content elements are disposed within a same portion of a hierarchy of content elements for the markup language document, which may also be termed being part of the same "subtree" of the hierarchy. While many publishers of markup language documents may arrange markup elements for content elements in this manner, not all publishers follow this practice. Accordingly, in some cases, related content elements may have markup elements arranged in different subtrees of the hierarchy.

In some embodiments, a selection facility may account for the possibility of related content being arranged in different subtrees by examining a layout of content elements in an area of the first visible content element, that was identified by user input as the content element of interest, to determine whether adjacent content elements meet criteria for being potentially related. For example, if the first visible content element (that was indicated by user input) is a form control, the selection facility may examine the adjacent visible content element (if any) to the left above the form control and the adjacent visible content element (if any) above the form control to determine whether the either adjacent visible content element is within a threshold distance and is a text element containing a small amount of text (e.g., up to a threshold number of words or characters). If either adjacent visible content element is a short text that is close to the form control, then it is possible that the adjacent visible content element is a label for the form control that should be selected by the selection facility as related to the form control. As another example, if the first visible content element is a paragraph, the selection facility may examine up to a threshold number of visible content elements disposed vertically above and vertically below the first visible content element to determine whether, for example, the paragraph appears in a collection of paragraphs that is bounded above by a heading or whether the paragraph appears in a collection of paragraph bounded above and below by headings. In either case, the paragraphs and the heading at the top are likely to be related content and the selection facility may select the content.

Accordingly, in some embodiments the selection facility may examine a layout in an area of the markup language document in which the first visible content element (indicated by user input) is displayed to evaluate whether adjacent visible content elements satisfy criteria for being related. The criteria may be based on a type of the first visible content element. The adjacent content elements that are evaluated may include immediately adjacent visible content elements or visible content elements that are up to a threshold number of content elements away.

Through such a selection process, the selection facility may identify as related visible content elements that are disposed in multiple different subtrees of the markup language document. The selection facility may then simplify its selection by identifying whether any of the selected visible content elements are containers of other selected visible content elements, such that the container elements would be parents (or grandparents, etc.) of other selected visible content elements in the hierarchy of content elements of the markup language document. If so, then the selection facility may remove from its selection the child (or grandchild, etc.) elements, as the selection facility will in a later step select all child elements of the selected elements, as should be appreciated from the foregoing and discussed again below. Once the selection facility has simplified its selection in this way, the selection facility will have selected one or more content elements that are each a top-level element with respect to one another, in that no element is a container for any of the other elements. From there, the selection facility will select as the set of related visible content elements all visible content elements included below those one or more top-level elements.

As a result of one of the processes of FIG. 3, 4, or 6, a selection facility may select a single visible content element of a markup language document or a group of visible content elements that the selection facility has determined may be conceptually related, or are otherwise a distinct set of visible content elements. In some embodiments, the visible content elements selected in this manner may then be identified to an emphasis facility, as discussed above and in more detail below, and the markup language document may be edited to emphasize these visible content elements together in context with one another. It should be appreciated, however, that other embodiments are not so limited. The selection process described herein may be used for purposes other than emphasis and embodiments are not limited to using the selected set of visible content elements for any specific reason. As another example, the selection process might be used by annotation system in which a user inserts notes or other annotations relating to content of a markup language document. For example, a user may indicate one visible content element and the system may identify, using the selection techniques described above, set of related visible content elements, and the annotation may be applied to the set of related visible content elements as a group. Any type of task may be performed on visible content elements selected using the selection techniques described herein, as embodiments are not limited in this respect.

Figure 7:
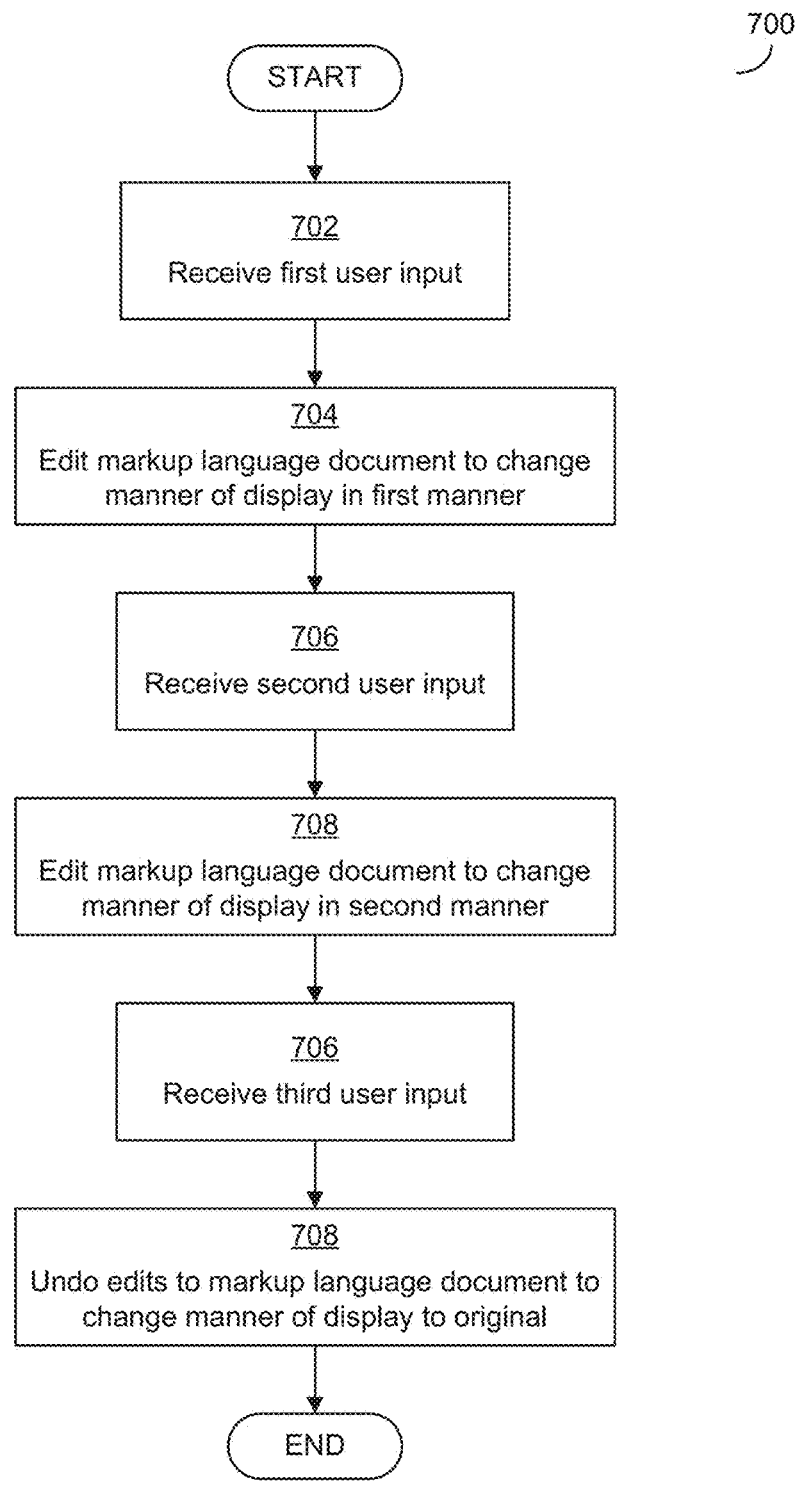
FIG. 7 is a flowchart of an illustrative process for editing a markup language document to emphasize visible content elements in response to user input, which may be implemented in some embodiments.
Figure 8A:
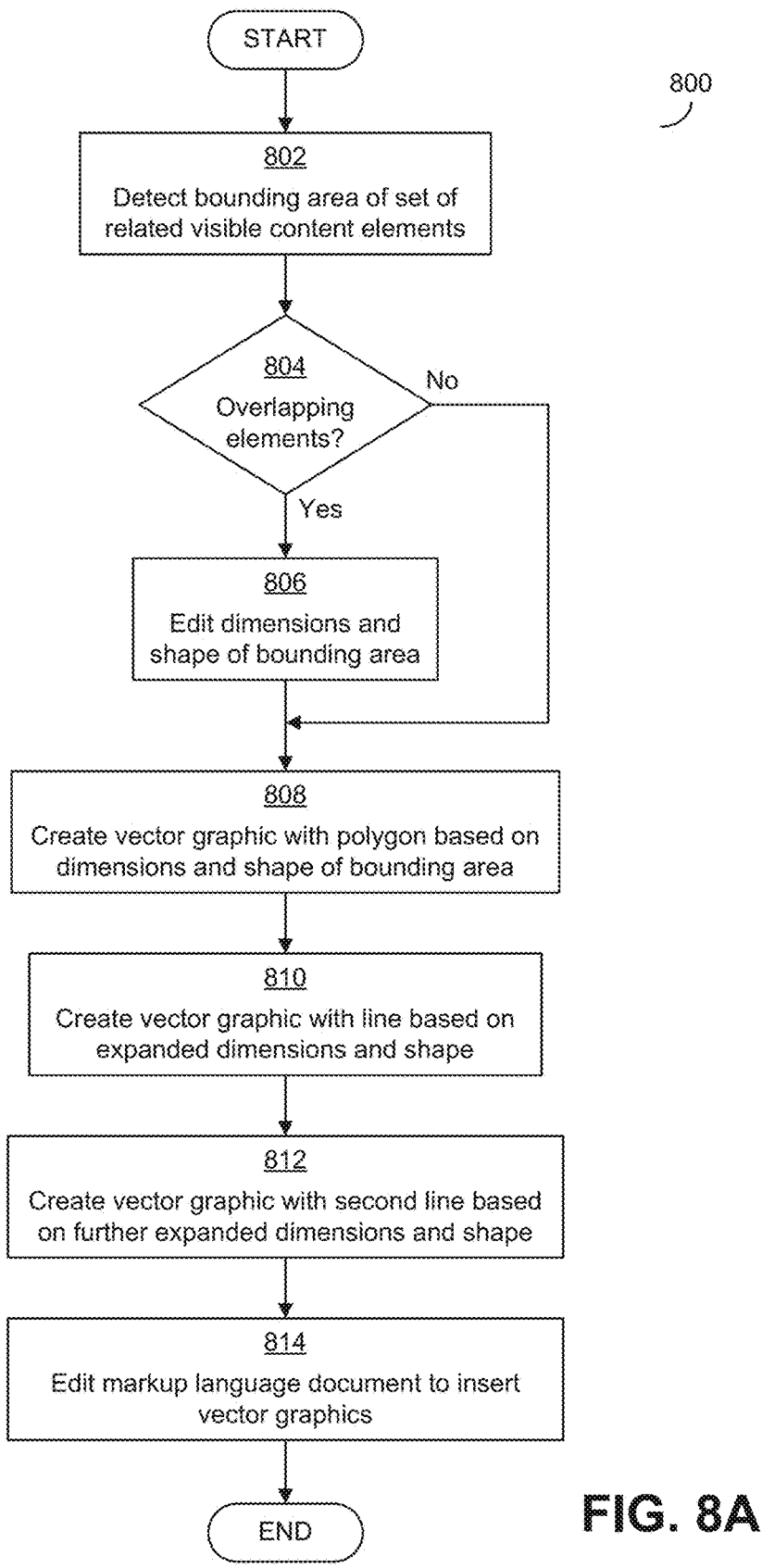
FIG. 8A is a flowchart of an illustrative process for editing a markup language document to highlight visible content elements, which may be implemented in some embodiments.
Figure 8B:
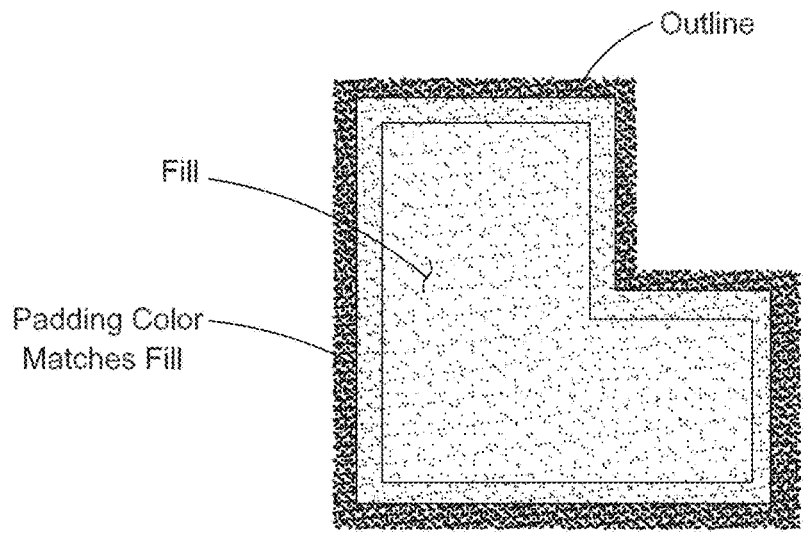
FIGS. 8B-8C are illustrations of highlighting techniques that may be used in connection with the illustrative process of FIG. 8A.
Figure 8C:
Figure 9:
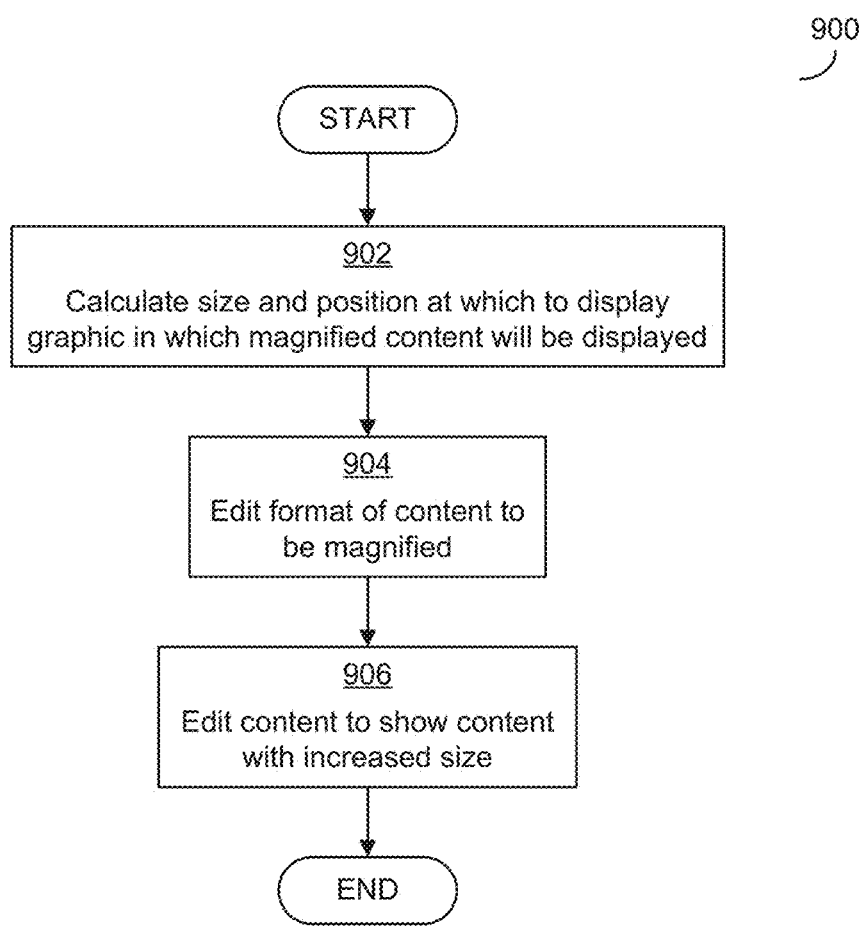
FIG. 9 is a flowchart of an illustrative process for editing a markup language document to magnify visible content elements, which may be implemented in some embodiments.

In some embodiments, though, once the selection facility has selected a set of one or more related visible content elements, the selection facility may identify that set of one or more related visible content elements to an emphasis facility. The emphasis facility may then edit the markup language document to change a manner of display of the one or more visible content elements, such as in some cases to increase a visibility of the one or more visible content elements. It should be appreciated that embodiments are not limited to changing the manner of display of visible content elements in any particular manner. FIGS. 7-9 illustrate examples of techniques that may be implemented by an emphasis facility in some embodiments. For ease of description below, the set of visible content elements will be described as a plural set, rather than continuously as a "set of one or more." It should be appreciated, however, that in some cases the selection facility may identify only one visible content element for which there are not related visible content elements together with which it is to be emphasized.

FIG. 7 illustrates an example of a process by which an emphasis facility may respond to user input by modifying a markup language document to emphasize visible content elements. The process 700 may be carried out after a viewing application has downloaded and processed a markup language document, into which the emphasis facility may be incorporated. The process 700 may also be carried out after the visible content elements of the markup language document have been displayed. In some embodiments, as should be appreciated from the discussion of process 700 below, a selection process carried out by a selection facility may also be performed prior to the start of the process 700 to identify a set of related visible content elements.

The process 700 begins in block 702, in which a first user input is received. The first user input may be a user input requesting that a first change to a manner of display of the set of visible content elements be applied. In some embodiments, the first user input may be a user input specifically associated with a request that the first change be made, such as a keystroke specifically associated with the first change or a selection of a user interface button associated with the first change. In such cases, the set of visible content elements to which the first change is to be made may have been identified before the start of process 700, such as based on an earlier user input identifying one visible content element. In other cases, though, the user input received in block 702 may be a user input that indicates a visible content element, and the selection facility may identify the set of visible content elements based on that same user input. Following receipt of the user input in block 702 (and, in some embodiments, identification of the set of related visible content elements), the emphasis facility edits the markup language document in block 704 to make a first change to the manner of display of the set of related visible content elements. In block 706, the emphasis facility receives a second user input, which may be a user input specifically requesting that another change to the manner of display be made. In block 708, in response to the second user input, the emphasis facility again edits the markup language document to change the manner of display of the set of related visible content elements. The editing of blocks 704, 708 may be similar, in that edits may be made to a set of markup elements related to the set of related visible content elements. The editing may involve modifying markup elements that were in the original, unedited markup language document and/or inserting new markup elements, and the editing in block 708 may involve editing markup elements that were previously modified in block 704 or that were inserted in block 704. In block 710, the emphasis facility receives a third user input and, in response to the third user input, in block 712 reverses the editing of blocks 704, 708 to restore the set of related content elements to their original form, without emphasis. In some embodiments, the reversing of block 712 may be done in two stages in response to two user inputs, following the two-stage form of the editing of blocks 704, 708. For example, in response to a third user input, the emphasis facility may undo the editing of block 708, and in response to a fourth user input, the emphasis facility may undo the editing of block 704. As should be appreciated from the foregoing discussion of FIG. 2, the emphasis facility may implement the undoing by storing an original, unedited form of the markup elements for the set of related visible content elements. To carry out the two-stage reversal, the emphasis facility may similarly store information regarding the markup elements following the editing of block 704 and prior to the editing of block 708. Once the editing is reversed in block 712, the process 700 ends.

It should be appreciated that the user input received in blocks 702, 706, 710 may be any suitable form of user input. Examples of user input, including via pointing devices, keyboards, and touch interfaces, are described above in connection with FIG. 2. Any of these types of user input, or other types of user input, may be implemented in embodiments, as embodiments are not limited to operating with any particular form of user input. In some embodiments, the user input of block 702 may be an input moving a cursor of a pointing device to hover over a particular visible content element that both indicates to the selection facility a visible content element of interest to the user from which a selection of related visible content elements can be made and requests that the emphasis facility make first change to the display, and the user input of block 706 may be a keystroke, such as a keyboard input, that requests that the emphasis facility make the second change to the display.

It should also be appreciated that the emphasis facility is not limited to making any particular changes to the display of the set of related visible content elements. In some embodiments, the first change that is made may be to highlight the set of visible content elements and the second change that is made may be the magnify the set of visible content elements while keeping other visible content elements the same size. However, other embodiments may combine either or both of these changes with other changes, or make may different changes. In some embodiments, for example, font properties of text may be changed by an emphasis facility. The alteration of font properties may include changing a typeface of text to a typeface preconfigured by a user, such as one the user finds easy to read, or preconfigured by the emphasis facility as one generally easier to read such as a non-serif typeface or a typeface that is designed for easy reading by users with dyslexia. Alteration of font properties may additionally or alternatively include changing inter-paragraph, inter-line, inter-word, or inter-character spacing, such as to provide more separation and make the text easier to read for users with vision or reading difficulties. Alteration of font properties may also include removal of or addition of italics, capitalization, or boldface to make the text easier to read. For example, the first letter of each sentence may be made boldface to make sentence separations easier to see for some users. Alteration of font properties may also include removal or changing of the justification of text. For example, some users may find center-justified or right-justified text hard to read, or find the spacing variation in full-justified text hard to read, and the justification of the text may be changed to left-justified. Sentence layout properties may also be changed in text, such as by increasing the spacing between sentences to make the separation between sentences easier to perceive. Color properties of visible content elements may also be adjusted. For example, bright colors may be difficult for users to perceive content in those bright colors, and the colors may be changed to be more muted colors that may be easier to see. As another example, where a background color of the visible content elements provides low contrast with the foreground color of the visible content elements, this may make viewing the content more difficult and the emphasis facility may change one or both of the background color and foreground color to increase the contrast. Highlighting may also be inserted by the emphasis facility, such as by changing a background color of the set of visible content elements and/or adding a border. A size of the visible content elements may also be adjusted to be larger than a default size.

Any of these changes, or other suitable changes, may be made to the set of related visible content elements. The changes may serve to improve visibility of the set of related visible content elements. The changes may also serve to visually separate the set of related visible content elements from surrounding visible content elements, as the changes will not be made to the surrounding visible content elements.

In some embodiments, in addition to or as an alternative to editing the markup language document to improve visibility of the set of related visibility content elements, the emphasis facility may also provide the content to another module for output in another medium, such as a text-to-speech program or a Braille display. In some such embodiments, the emphasis facility may cooperate with the other module to edit the display along with the output via the other medium. For example, in one embodiment the emphasis facility may emphasize each word of text in turn as that word being spoken by a text-to-speech program.

Accordingly, it should be appreciated that a variety of changes may be made to a markup language document to emphasize visible content element, as embodiments are not limited in this respect. In connection with FIGS. 8A-9, two examples of changes that are highlighting and magnification are discussed, but embodiments are not limited to implementing these particular changes or any other changes.

In some embodiments, the emphasis facility may edit a markup language document, once a set of related visible content elements have been identified, to visually separate those visible content elements from surrounding visible content elements using highlighting and a border. There are a variety of ways in which highlighting and borders may be inserted into markup language documents. FIG. 8A illustrates an example of a process for inserting highlighting and a border using vector graphics, with FIGS. 8B and 8C illustrating the form of the highlighting and an example of the highlighting applied to content, respectively.

A Scalable Vector Graphic (SVG) is a type of image that is defined using markup language, specifically Extensible Markup Language (XML). As a "vector" graphic, the image is not defined as a series of pixels or points, but is instead defined by regions of color. For example, the markup language content of an SVG may indicate a set of coordinates or dimensions for a polygon and indicate that the polygon should be colored red. The inventor has recognized and appreciated that such an image may be quickly defined by an emphasis facility by outputting dimensions for one or more polygons within an SVG. Moreover, the inventor has recognized and appreciated that such an image may be easily specified for use within a markup element, such as a CSS markup element, by outputting the markup for the SVG in a "Data URL" format in which the markup language is listed in a URL in the same manner as elements of a web address.

In some embodiments, an emphasis facility may add highlighting and a border to a set of related visible content elements by using a combination of two or three vector graphics specified using markup language, which in some cases may be SVG images. FIG. 8A illustrates an example of such a process. The process 800 of FIG. 8A begins in block 802, in which the emphasis facility determines dimensions of a bounding area for the set of related visible content elements. The bounding area may be a display area in which all of the visible content elements of the set are displayed. The emphasis facility may determine the bounding area by determining the bounding area for each of the individual visible content elements, and determining a rectangular area that extends over at least the union of the bounding areas for each of the individual visible content elements. The bounding areas for each individual visible content element may be determined using known techniques, including JavaScript functions like "element.getBoundingClientRect( )" for images or other non-text objects, and for text objects by adding a DOM object that includes only the text and then using a "range.getBoundingClientRect( )" function on the new object. When determining the bounding area for each of the individual visible content elements, in some embodiments a padding or margin that is defined by formatting for a visible content element may be determined and subtracted from the bounding area for that content element, to obtain the true dimensions for the element. In addition, in some embodiments, the ancestor elements of the hierarchy for a content element may be evaluated to determine whether they apply any clipping that would prevent some of the bounding area of the content element from being displayed. If so, then to obtain the true bounding area the clipping of the ancestor element may be applied to remove some of the bounding area of the visible content element.

Once the bounding area for all of the visible content elements of the set of related visible content elements has been identified as the rectangular union of the bounding areas of each visible content element, the bounding area is evaluated in block 804. Specifically, the bounding area is evaluated in block 804 to determine whether the bounding area includes a part or a whole of any other visible content element. For example, unrelated content elements, such as floats, may extend over a part of the rectangle of the bounding box. In this case, to ensure the highlighting is not incorrectly applied to these other visible content elements, a shape of the bounding box should be changed from a rectangle to a polygon that wraps around but does not cover the other content elements. To make the determination in block 804, each of the four corners of the rectangular bounding area identified in block 802 are evaluated to determine whether any of the four corners is a point at which is located a visible content element that is not one of the set of related visible content elements, not a child (or grandchild, etc.) of one of the set of related visible content elements, and not a parent (or grandparent, etc.) of one of the set of related visible content elements. If, in block 804, one or more of the corners is found to cover another content element, then in block 806 the bounding area determined in block 802 is edited. The emphasis facility may edit the shape and dimensions of the bounding area in block 806 to wrap around the element(s) found at the original four corners of the rectangular bounding area, by determining the bounding areas of the found element(s) and adjusting based on the bounding areas of the found element(s). In some embodiments, the adjustment of block 806 may only be performed for element(s) identified in block 804 that have a float property set that configures surrounding content to wrap around the found element.

Once the dimensions and shape of the bounding area have been edited in block 806 (or was determined in block 804 not to overlap other elements), the emphasis facility in block 808 creates a vector graphic, using markup language, that includes a polygon having the shape and dimensions of the bounding area. The emphasis facility may specify a color of the polygon that will be the background highlighting color of the set of related visible content elements when the vector graphic is inserted into the markup language document. By having a polygon that has the same dimensions and shape as the arrangement of visible content elements in the set, the emphasis facility can insert the vector graphic to highlight only the set of related visible content elements without highlighting some or all of any surrounding visible content elements, and thus visually separate the set of visible content elements.

In some cases, it may be disadvantageous to have highlighting that extends only to the very edge of the set of visible content elements, and may instead be preferable for the highlighting to extend slightly beyond. This may be because, in some cases, highlighting or a border disposed at the exact edge of the set of visible content elements may obscure the edges of the visible content elements, such as making text more difficult to read. Accordingly, in block 810 the emphasis facility slightly expands the dimensions and shape determined in block 806. The slightly expanded dimensions may cover the bounding box of the set of related visible content elements plus a margin area. The emphasis facility may then specify a second vector graphic, using markup language, that includes a line following the expanded dimensions and shape and having a certain width, where the width corresponds to the desired width of the highlighting beyond the edge of the visible content elements. The emphasis facility may specify that the line have the same color as the polygon of block 808, such that the line and the polygon may appear to blend together on a display screen as one highlighting element.

In some embodiments, it may also be desirable to insert a border around the highlighting, to further visually separate the set of related visible content elements from surrounding visible content elements. Accordingly, in block 812 the emphasis facility again slightly expands the dimensions and shape determined in block 806. The slightly expanded dimensions may cover the bounding box of the set of related visible content elements plus a second margin area that is larger than the margin area used in block 810. The emphasis facility may then specify a third vector graphic, using markup language, that includes a line following the second expanded dimensions and shape and having a certain width, where the width corresponds to the desired width of the border. The emphasis facility may specify that the line have a different color than the color specified in blocks 808, 810, such as a second color having high contract with the first color of blocks 808, 810 to provide a definite border. In block 812, the emphasis facility may also edit the shape and dimensions (after expanding them) to insert rounded corners on the line that is generated.

In block 814, the emphasis facility edits the markup language document to insert the three vector graphics created in blocks 808-812. The emphasis facility may insert the graphics in any suitable manner.

In some embodiments, for example, the emphasis facility may edit the markup language document to indicate that the polygon vector graphic created in block 808 is to be displayed as a background graphic of the set of related content elements, such as by setting a "background" attribute on an existing markup element. In some embodiments, "background" attributes of a CSS markup element may be used to set the polygon vector graphic as a background element. Such attributes may support the display of multiple background images or graphics together, in a vertical stack, with the first-specified being the lowest in the stack. In embodiments that use such attributes, the emphasis facility may set the polygon vector graphic to be displayed as the only background graphic, if the emphasis facility determines that no background attribute was previously set, or to be displayed as the lowest background graphic in the stack, if the emphasis facility determines that a background attribute already specifies one or more graphics to be used. For example, the emphasis facility may set a "background-image" attribute to the polygon vector graphic by representing the vector graphic as a Data URI, including by prepending the polygon vector graphic to a comma-delimited list to identify the polygon vector graphic as the lowest-level background image if one or more background images were previously set. Other background attributes may also be set in some embodiments that use such background attributes. For example, a "background-repeat" attribute may be set to no repeat, "background-position" may be set to a desired position at which to display a background image, which in this case may be set to a top-left corner of a bounding box for the set of related visible content elements (or to any other suitable position), a "background-attachment" attribute may be set to scroll, a "background-origin" attribute may be set to 'border-box', a "background-clip" attribute may be set to 'border-box', and a "background-size" attribute may be set to 'auto auto'. As an alternative to setting some of these attributes individually, a "background" attribute may be used to set some of these attributes collectively. It should be appreciated that the values specified for these attributes are only examples, and that other values may be used to display a polygon vector graphic as a background on a set of related visible content elements as above. In the case that the "background" attribute is set, the emphasis facility may ensure that a "background-color" attribute is not changed from an original setting.

In some cases in which a background attribute is used, a viewing application may not permit the background (here, the polygon vector graphic) to extend by any amount beyond the bounding box of the set of visible content elements. It is in these embodiments that, to provide to extra padding highlighting beyond the very edge of the visible content elements of the set, that the second vector graphic of block 810 may be used.

In other embodiments, however, the emphasis facility may insert each of the new vector graphics as a new element that is positioned precisely at the position of the set of visible content elements and to be displayed behind those elements but in front of surrounding elements, which is known as an overlay image. The emphasis facility may configure the overlay images with z-indexes (which regulate which visible content elements are in front of or behind the overlay images) that set the new overlay images on top of each of the visible content elements of the set, or behind each of the visible content elements of the set, through evaluating the z-indexes of the elements in the set. By inserting overlay elements that are positioned behind the set of related visible content elements, the new overlay elements may be perceived as background on those elements with the border surrounding the elements. With transparent coloring, an overlay element positioned on top of the set of related visible content elements may also appear to be background highlighting, but may also partially obscure the content. When an overlay image is inserted, the emphasis facility may insert the markup elements for the overlay image at a part of the markup language document that is different from a part of the markup language document describing the set of visible content elements. For example, the emphasis facility may insert the new markup elements at an end of the markup language document. This may be advantageous in some embodiments, as placing the new markup elements at an end of the document may avoid inadvertent errors with scripts or other elements of the markup language document that depend on a precise arrangement of markup elements and do not account for insertion of new markup elements.

In some embodiments, the emphasis facility may use criteria to select between specifying the polygon vector graphic as a background image or as an overlay. In the case that the selection facility has selected multiple top-level elements rather than a single one (as discussed briefly above following the discussion of FIG. 6), an overlay image may be used to allow two display areas for the two top-level elements to be smoothly merged, as discussed below. As another example, if the set of related visible content elements only includes images, such as one or more images, an overlay may be used, or no background highlighting may be used as the background highlighting would not show through the image(s).

In the case that overlay images are used, the dimensions of the polygon exactly equaling the dimensions of the bounding area of the set of related content elements may not be as important and, accordingly, the dimensions of the polygon may be slightly expanded and the second vector graphic of block 810 may not be used.

The process 800 ends following the editing of block 814.

FIG. 8B illustrates the arrangement of three vector graphics of the example of FIG. 8A, including the polygon in the middle surrounded by a first line element and a second line element. For ease of illustration, the first line element is shown with a different color than the polygon, though in some embodiments the first element may have the same color as the polygon to provide an appearance of a single highlight provided by the two vector graphics.

FIG. 8C illustrates the highlighting applied to a paragraph of text in a web page to visually separate the text from surrounding visible content elements. As shown in FIG. 8C, the shape of the polygon and the two lines is such that the highlighting extends only to cover the text and not the image located to the right of the text.

As mentioned above in connection with selection techniques, in some cases a selection facility may identify multiple top-level objects that identify the set of related visible content element, which are the children of those multiple top-level objects. In this case, the identification of the bounding box as in block 802 of FIG. 8 may be slightly adjusted. The emphasis facility may, in some cases, simply identify a large rectangular bounding box that encompasses all of the visible content elements that are children of each of the top-level elements. In other embodiments, a more complex process may be used. The same rectangular bounding box of block 802 may be determined for each of the top-level elements, and the process of blocks 804-806 for editing the rectangular boxes to exempt surrounding visible content elements may also be performed for each of the rectangular bounding boxes. Subsequently, the emphasis facility may determine whether any of the bounding boxes determined in this manner overlap. Any suitable process may be used, including a ray casting process such as the ray-casting process described in the web page available at http://stackoverflow.com/questions/217578/point-in-polygon-aka-hit-test, which is incorporated herein by reference in its entirety. If overlapping bounding boxes are found, then each such overlapping bounding box is merged into a polygon that is the combination of those bounding boxes. Any suitable polygon merging process may be used. As one example, each of the corners of two bounding boxes to be merged may be identified, and corners of one that are disposed within the other may be removed. The list of corners may then be sorted according to the process described in the web page available at http://stackoverflow.com/questions/17862162/sort—anticlockwise—the-points—of—rectilinear-polygon#answer-17863840, which is incorporated herein by reference in its entirety. Through this process, the corners are sorted by y-coordinate and, for matching y-coordinate, by x-coordinate. This sorted list of coordinates will describe a set of edges and the merged polygon is described by the edges. The process may be repeated with pairs of polygons for any overlapping polygons until there are no more overlapping polygons. If at that time there is only one polygon, the remainder of the process 800 may be performed using the dimensions and shape of the merged polygons. If, however, two or more polygons remain, then the process 800 may be completed with two or more polygons and each vector graphic created by the emphasis facility may include two or more shapes (e.g., two or more highlighting polygons or two or more lines), each set based on the dimensions of the non-overlapping polygons. In such a case, an overlay image may be used, as it may be best to position the overlay image on top of the content to be highlighted with the vector graphics having semitransparent coloring, to prevent any clipping that might arise from setting multi-polygon vector graphic as a background image or as behind other content.

In some embodiments, in addition to or as an alternative to highlighting web content, the emphasis facility may magnify the set of related visible content elements. An example of magnification is shown in FIGS. 1C-1D. As shown, the set of related visible content elements (which may be one visible content element, as in the example) are excerpted from surrounding visible content elements and displayed superimposed on the original content, with an increased size within a border and with a different background graphic. The border and different background graphic may give an impression to a viewer that the magnified content has been magnified out of the original page, similar to an effect that a traditional magnifying glass might have on a paper being magnified or an effect that a traditional software lens may give on a computer display.

FIG. 9 illustrates an example of a process that may be used in some embodiments to magnify a set of related visible content elements. The process 900 begins in block 902, in which the emphasis facility sets a size and position of a "lens" for particular content. The size and position of the lens may be set based on a variety of factors, including user input or user configuration, the size of the display area of the viewing application, the size or position of the visible content elements to be magnified. With respect to user configuration, the user may specify an amount of magnification to be applied, which may affect a size of the lens that is to display that magnified content. With respect to the size of the visible content elements to be magnified, the emphasis facility may be configured to, when possible, set a size of the lens such that all of the magnified content fits within the lens and the content does not need to be scrolled within the lens or otherwise extend outside of the display area of the viewing application. The emphasis facility may also be configured not to set the size of the lens to be as big as the display area of the viewing application in either width or height, to allow some of the surrounding content to be displayed beyond the edges of the lens. The emphasis facility may attempt to set the width of the lens such that the lens is wide enough to allow visible content elements of the set that were originally arranged horizontally to be arranged horizontally within the lens, or otherwise prefer the existing layout of visible content elements of the set. Though, the emphasis facility may also in some embodiments limit a width of the content, to prevent a user needing to read very wide content.

With respect to position of the lens, each of the left, right, top, and bottom sides of the lens may be calculated based on the corresponding sides of the bounding box for the set of related visible content elements and on the desired size of the lens calculated as above. For example, a coordinate for a left side of the lens may be determined by starting with the coordinate of the left side of the bounding box and then subtracting half of the difference between the width of the bounding box and the desired width of the lens. If that calculated coordinate is farther to the left than a minimum left-hand coordinate, the calculated coordinate is set to the minimum left-hand coordinate. On the other hand, if the calculated coordinate plus the desired width of the lens leads to a right-hand coordinate that is farther to the right than a maximum right-hand coordinate, the left-hand coordinate may be shifted to allow the right side to be at the maximum right-hand coordinate. Through these calculations, the emphasis facility may locate the lens at a position related to the original position of the content.

In block 904, the emphasis facility may change a formatting for the set of visible content elements to be magnified. Any of the examples of formatting changes described above in connection with FIG. 7 may be made to visible content elements to be magnified in connection with the process 900. For example, font properties of text may be adjusted before magnification such that the magnified text is in a font that is easier to read. As another example, colors may be adjusted such that the visible content elements are in colors that are easier to perceive. Any suitable changes may be made to the content.

In block 906, the emphasis facility edits the markup language document to display the set of related visible content elements within the lens and with an increased display size while maintaining surrounding visible content elements in their original sizes. The magnification may also be carried out so as to preserve an original position and layout of the surrounding visible content elements. Examples of ways in which the magnification may be carried out are described in detail in the following paragraphs.

In addition to magnifying the set of related visible content elements in block 906, in block 908 the emphasis facility may edit the markup language document to insert an overlay image (e.g., an SVG image or other image) that is partially transparent and has a gray color or other color. The emphasis facility may edit the markup language document to display this new overlay image over all content except for the lens, through adjusting the z-index of the new overlay image or in any other manner. By inserting this overlay image, the emphasis facility may de-emphasize surrounding visible content elements not shown in the lens. The de-emphasis in this case may be effected by "graying out" the surrounding content with the new overlay image. Such graying out is shown in the example of FIG. 1D, as compared to the original form shown in FIG. 1C.

Once the emphasis facility edits the markup language document in blocks 906 and 908, the process 900 ends.

The emphasis facility is not limited to performing the magnification of visible content elements in any particular manner. Two examples of ways in which the magnification may be performed are described below, but it should be appreciated that others are possible.

One way that the emphasis facility may magnify the set of visible content elements while maintaining surrounding visible content elements in the same size and at the same positions is to duplicate the set of visible content elements to be magnified. Once the selection facility has identified the set of visible content elements by identifying a container for the visible content elements, the emphasis facility may copy from the markup language document all markup elements (e.g., HTML elements, CSS elements, etc.) that are contained within the container and thus relate to the set of related visible content elements. The emphasis facility may then insert into the markup language document new markup elements defining a new container that has the border and background as illustrated in FIG. 1D. The emphasis facility may then insert into the new container all of the duplicated markup elements. The emphasis facility may, at that time, also adjust any spacing or position properties of the duplicated markup elements such that the visible content elements described by the duplicated markup elements are positioned within the lens. By duplicating the markup elements in this manner, the emphasis facility also duplicates the definition and description of the set of related visible content elements, and thus inserts into the markup language document a duplicated set of the related visible content elements. The emphasis facility may then configure the new container, and all elements disposed therein, to be displayed with an increased size. For example, the emphasis facility may insert a markup element (e.g., a CSS 3.0 markup element), or modify an existing markup element to insert a new attribute or modifying an existing attribute, to specify that a scale transform is to be applied to the new container to display the visible content elements within that container with an enlarged size.

The duplicating method described in the preceding paragraph is advantageous in that it allows for magnifying content without needing to account for position and layout of surrounding visible content elements, and may thus be simpler. However, it may be disadvantageous in some cases as it may prevent scripts or some other content of the markup language document from working properly while the lens is displayed. For example, when the visible content elements are duplicated, the identifiers of tags within the duplicated region may also be duplicated. The duplicated identifiers may lead to scripts or other original content within the markup language document not being able to appropriately interact with content using the identifiers, as the viewing application may be unable to definitively identify the content element to which to send a message or to which to make a change, due to the presence of two content elements sharing an identifier.

In some embodiments, the emphasis facility may implement an alternative approach in which the set of visible content elements is magnified in place. In some implementations of this alternative approach, the emphasis facility applies styles and executable code to the set of related visible content elements (e.g., by applying that style and code to each top-level element selected by the selection facility), to magnify the visible content element and/or add visual enhancements, and to position the magnified (and otherwise edited) visible content elements above other content as shown in the example of FIG. 1D.

Some embodiments use a list of style rules that can be applied to the lens content. These style rules can include, for example:

1. Content enlargement styles such as the scale transform, changes to fonts, and/or the CSS zoom attribute.
2. Styles which implement additional visual enhancements, such as any enhancements described above in connection with FIG. 7.
3. The width, height and/or max-height of the lens, which may be adjusted according to sizing rules described in connection with FIG. 9 and below.
4. Overflow and/or scrolling styles which may be used to accommodate fitting content in the visual space provided, and/or scrolling to overflow content.
5. Use of borders, outlines and/or shadows to create visual separation with other content not in the lens view. However, when there are multiple top level elements in the selected content (as described above), using these styles may cause visibly overlapping rectangles. To avoid undesired overlaps in the case of multiple top level elements, some embodiments may add borders, outlines and shadows via one or more overlays, which are described below.
6. Changes to the background color, which may be especially useful if the original background color uses a transparency effect. The new background color may remove the transparency so that underlying content does not show through the lens.

7. Addition of padding, for example in the same color as the background, to create visual separation from borders, outlines and/or shadows used.

As a result of the emphasis facility applying these styles to the set of related visible content elements, the width and height of the lens content may change as the browser reflows content following the changes.

In some embodiments, the emphasis facility may position the lens to appear in a specific location. Some examples of lens positioning criteria are described above. To position the lens, for example, the emphasis facility may set any or all of the following CSS properties on the set of visible content elements: left, top and position. The emphasis facility may set the position property according to one of the following:

| CSS position type | Coordinate system (Origin point that left and top properties are relative to) |
| --- | --- |
| relative | top-left point where the content would have been positioned in the layout of the document, if it had used static positioning. |
| fixed | top-left of the viewport |
| absolute | If an ancestor uses CSS positioning other than static positioning, the top-left point for that ancestor<br>Otherwise, the top-left of the document element |

Any of the above position types can be used. With any of these types, that content can be restyled without the insertion of additional DOM nodes in the middle of the content, and thus compatibility with the content's styles and executable code can be preserved.

The inventors have recognized that the choice of positioning type may affect the following:

How the left and top properties values to be set may be calculated (as what they're relative to may change as described in the table).

The amount of left and top spacing adjustment applied. This spacing adjustment may help prevent the underlying content from shifting as the lens width and height are altered from the original content.

In some embodiments, the emphasis facility may compute the position not only by calculating the difference between a desired position and a position determined from the above table. In some embodiments, the emphasis facility may account for the use of any scale transform applied to the content. For example, if the size of the content is doubled in the lens, then the emphasis facility may determine the position of the lens by dividing by two the amount of pixels by which the emphasis is to be moved to the left.

In some embodiments, the emphasis facility may set the size of items in the lens content using the CSS scale transform. For instance, to double the size of the content, the emphasis facility may set the scale transform to 2. In some embodiments, the emphasis facility may make further adjustments, in addition to scaling the content. One reason may be that it may be desirable in some embodiments to adjust the aspect ratio of content in the lens from the original aspect ratio, such as to decrease the length of lines of text (e.g., because shorter lines may be easier to read).

To accommodate these types of changes, the emphasis facility may make any suitable adjustments to the size of the lens. In one example, the emphasis facility may use the following approach:

1. Use CSS width to set the desired width of the lens. The actual value to set may be the desired width in pixels, divided by the lens magnification level (e.g. 2 for 2× magnification).

2. Set the CSS height to "auto"

3. Set the CSS max-height to the amount of height the lens is allowed before it breaks the sizing rules described in section 4.5, e.g. extends beyond the bottom of the screen.

It should be appreciated that the emphasis facility is not limited to using left/width and top/height to set the size and position, and any other suitable technique may be used. As another example, setting any 2 of 3 the properties in the below chart may set the position and size for a given dimension.

| Dimension | Set 2 out of 3 of the following properties to set the position and size |
| --- | --- |
| Horizontal | left, width, right |
| Vertical | top, height, bottom |

In some cases, style changes on the lens may affect layout of underlying content. For example, if the choice of positioning for the lens (as discussed above) is either absolute or fixed, this may cause the set of related visible content elements, to be displayed in the lens, to be removed from the layout flow. This may cause the surrounding content to fill in the space previously occupied by the set of visible content elements, but it may be undesirable to allow surrounding content elements to change position. As another example, as part of the magnification the emphasis facility may allow the set of related visible content elements to change in size as described briefly above and in more detail below. This change in size could cause the set of related visible content elements to require a different amount of space, which would normally require the surrounding content to reflow around the expanded set of related visible content elements.

In other embodiments in which the emphasis facility inserts a graphical transform, such as the CSS 3.0 scale transform, to cause the magnification of the set of related visible content elements, the transform may not affect the amount of area that the viewing application (e.g., the web browser) allocates to the set of related visible content elements. As such, use of this transform may not cause changes to the positioning of the surrounding content elements that would require the emphasis facility to make counteracting adjustments to prevent changes in position. For example, magnifying the set of related visible content elements to be displayed in the lens using the CSS 3.0 scale transform may cause the browser to increase the size of the set of related visible content elements without changing the positioning of surrounding visible content elements in response. This may result in a desirable effect of the lens content emerging out of and covering up some of the surrounding content, provided that adjustments are made, as discussed below, to ensure that the set of related visible content elements are configured to display on top of the surrounding visible content elements, such as through adjusting z-index, and will not be displayed below the surrounding content.

However, in other embodiments, other implementations of magnification and/or other enhancements to the lens content, such as the addition of padding, borders and margins, font changes, etc., may cause the viewing application (e.g., the web browser) to change the amount of space that it allocates to the set of related visible content elements. When the viewing application changes this amount of allocated space, this will cause changes to the positioning, text flow, etc., of surrounding content.

It may be desirable for the emphasis facility to ensure that surrounding visible content elements of the markup language document are not affected by the magnification, such that they maintain their original position, size, or other attributes. To prevent shifting the layout of surrounding visible content elements, the emphasis facility may be configured to make adjustments to the set of related visible content elements to be magnified and/or to the surrounding visible content elements. For example, the emphasis facility may:

1. Calculate the amount of horizontal and/or vertical shift that would be introduced by a change in magnification or position of the set of related visible content elements to be magnified
2. Add and/or remove space around the set of related visible content elements to make up the difference.

In embodiments that use this technique, the emphasis facility may calculate these shift values in any suitable manner. In some embodiments, to calculate a vertical spacing adjustment, the emphasis facility may sum the amount of vertical space (e.g., margin, border and padding) that the browser will allocate to the set of related visible content element. The emphasis facility may determine the vertical spaces to be summed, for example, using processes described above for determining a bounding area (e.g., a bounding rectangle or bounding polygon), which may include querying for the size of any applicable margins, borders, padding, etc. as described above. The emphasis facility may calculate this sum twice: once before applying style changes to the set of related visible content elements, and again after the emphasis facility has applied new styles to the set of related visible content elements as part of magnifying the set and display it in the lens. The difference between the two values may be the amount the view would shift without a space adjustment being made. Therefore, a space adjustment may be made as the reverse of this difference. The same logic may be applied to the horizontal dimension. Specifically, the calculation may determine the adjustment needed to keep the underlying content's horizontal positioning without shift. The only change may be that horizontal values are utilized in this case.

In addition to this basic space adjustment logic, additional computation can be applied in some embodiments to handle the following special cases:

Element takes more/less actual space than set explicitly by CSS styles: This may occur when the lens has a CSS float property. Processes described above in connection with FIG. 8 may be used to define the actual dimensions of the bounding area of the set of related visible content elements.

The browser slightly changes dimension values such as margins, paddings, width, etc.: This may arise in some browsers that support a CSS zoom property. Briefly, an example of this special case is that when a border has a width of 3 pixels with a zoom of 1.0 (i.e., no zoom), that border might evaluate to a slightly smaller value, such as 2.999 pixels, when zoom=1.1. One solution may be to calculate the difference between the dimension styles before and after the lens work. Then the difference in height/width is may be added (or subtracted) to (from) the final styles.

An element adjacent to the lens has smaller margins than the current element: Because the effective margin between two elements may be computed as the largest margin assigned to either, layout may be changed if the one of these elements is removed (e.g., when one of the elements is included in the set of visible content elements to be magnified and is removed from the layout). This may complicate the basic algorithm of spacing adjustments calculations as follows: if the lens's top margin becomes less than the above element's bottom margin, then which element's margin takes precedence may shift to the other element. One solution may be to detect the bounding elements and compare the margins. If the set of visible content elements has a greater margin than adjacent visible content elements, then the margins on the set of related visible content elements may be preserved without changes.

As the part of the exemplary processes described above, the bounding elements around the set of related visible content elements to be displayed in the lens may be detected in any suitable way.

As one example, the following process may be used in some embodiments to find the bottom and right bounding elements for a given element:

1. Start with current element
2. Does the next sibling of the current element exist?
   Yes: Set the current element to the next sibling
   No: Set the current element to the parent. If null or <body>, stop.
3. If the current element is hidden, go to step 2
4. Is bottom bounding element defined?
   Yes: Skip to step 6
5. Is current element's top>=lens element's bottom?
   Yes: Set bottom bounding element to current element
6. Is right bounding element defined?
   Yes: Skip to step 8
7. Is current element's left>=lens element's right?
   Yes: Set right bounding element to current element
8. If bottom or right bounding element is still undefined, repeat step 2

A similar process may be used to find the top and left bounding elements:

1. Start with current element
2. Does the previous sibling of the current element exist?
   Yes: Set the current element to the previous sibling
   No: Set the current element to the parent. If null or <body>, stop.
3. If the current element is hidden, go to step 2
4. Is top bounding element defined?
   Yes: Skip to step 6
5. Is current element's bottom>=lens element's top?
   Yes: Set top bounding element to current element
6. Is left bounding element defined?
   Yes: Skip to step 8
7. Is current element's right>=lens element's left?
   Yes: Set left bounding element to current element
8. If top or left bounding element is still undefined, repeat step 2

Once the emphasis facility determines the bounding elements, the bounding elements may be used to compute the effective margin, which may be the larger of the two adjacent margin values. For example, the margin above the lens may be the larger of: the top margin of the lens element, and the bottom margin of the top bounding element.

Having calculated the amount of horizontal and vertical shift, the emphasis facility may use these values to stabilize the page by removing space when the shift direction was positive or adding space when the shift direction was negative. Any suitable technique may be used to perform the space adjustment. Some examples are described below.

Space adjustment technique #1: Insert Placeholder Elements into the DOM

In this technique, the emphasis facility may insert an extra DOM element before or after the content which the lens has been applied to. The new element may have no visible content other than empty space, and may be there only to add or remove space. Space may be added by creating and styling the element to take up the desired extra space. Inserting extra nodes in the middle of a markup language document, however, may sometimes break styles or executable code applied to markup language document. For example, scripts incorporated into a markup language document may be written to be applied to every child, the first child, nth child or last child of a parent element. This code is generally written assuming that no other software will change the markup language document by inserting new content. Adding new children may therefore cause unintended consequences when additional children are present.

Space adjustment technique #2: CSS :before and/or :after pseudo elements as placeholders In this technique, the spacing changes may be applied to a pseudo-element created by browsers when a :before or :after style rule is present. This technique may have the advantage that "pseudo" elements are handled differently—not like any regular elements—by browsers. They are not natural DOM elements which can be found by selectors and, thus, may not break either page styles or scripts.

To apply this approach, in some embodiments the emphasis facility may determine whether to use a :before or :after pseudo element, and may determine the target element to apply the pseudo element to.

| Does next sibling of lens element exist? | Target element | Pseudo element to use on target element |
|---|---|---|
| Yes | Next sibling | :before |
| No | Parent | :after |

Next, the emphasis facility creates the :before or :after pseudo element for the target element. To do this, the emphasis facility may generate a style rule that applies to the target element. To do this, the emphasis facility may generate a CSS selector for this rule. One approach may be to set an attribute on the target element, and create a selector based on that. For example, some embodiments may set an attribute called data-placeholder on the element, and later remove it. Next, to add :before or :after to it, the emphasis facility may generate a style rule such as the following and insert it into the document:

```
[data-placeholder]:before {
    content: "";
    display: block;
    position: static;
    height: 30px;
    width: 50px;
}
```

To remove space, the inserted style rule can apply a negative margin to the pseudo element.

Space adjustment technique #3: Adjustments to CSS margin properties of elements

In this technique, the emphasis facility does not generate a placeholder element. Instead, the emphasis facility adds or removes space using CSS margin properties. Before applying any styles to the element, the emphasis facility saves all of the original styles, including margins, so that they can be restored later. The emphasis facility may calculate shift values as explained above and may subtract those values from the original margin values of the set of related visible content elements: vertical offset—from the initial top and/or bottom margin(s); horizontal offset—from the original left and/or right margin(s).

In some embodiments, the emphasis facility may set additional CSS properties on the set of related visible content elements and/or ancestors of the set, to prevent other elements from rendering on top of the related visible content elements of the set or clipping any of the related visible content elements. The emphasis facility may do this in any suitable manner, including by any or all of the following techniques:

z-index: setting the z-index may help to ensure that the lens is rendered on top of other content in the document (i.e., appearing closest to the user).

overflow: if an ancestor sets the overflow it may clip the lens to the size of that ancestor.

The z-index may be set when an element or its ancestors contain styles, including z-index and others, which affect the stacking context, or painting order, that an element belongs in.

Visually, the viewing application determines the painting order using the position of elements along a third axis typically referred to as the "z-axis." Stacking contexts lie along this "z-axis" and are formatted one on top of the other. The default stacking context is effectively using a z-index of 0. The z-index of each stacking context is expressed as an integer representing the order for rendering. Elements with higher stacking context appear to be closer to the observer.

Other CSS properties besides z-index may affect the stacking context. If the stacking context hasn't been created explicitly yet then: opacity, CSS non-static position, and 3d transform properties will force creation of a new stacking context.

Another factor may be that ancestors control the stacking contexts of their descendants. As a result:

Descendants are ensured to never have a higher stacking context than any ancestor that sets the stacking context.

To get the true stacking context for an element, some embodiments may find the smallest z-index in all ancestors of that element. The effect of other properties on the stacking context may still be constrained by z-index values in the ancestors.

Showing an element above all content may involve altering the z-index on ancestors that have a z-index set.

In the case of the lens, if the visible content elements have a low stacking context, the content will be partially displayed behind other elements on the page. However, it may be desirable for the visible content element of the lens to appear over all other elements. One way to fix this may be to set the z-index on the visible content elements of the lens, or on the top-level element(s) that were selected by the selection facility and by which the visible content elements were selected. The effect of ancestor z-index values as described above (item #1 from that list) may come into play in this technique.

Another technique that may be used is to change the z-index of the related visible content elements (and/or the top-level element(s)) and of all ancestors, or at least on elements that set the z-index. CSS overflow could also cause the lens to be partially hidden when using this technique, in a way that can look similar to the above screenshots.

Another exemplary implementation of the lens is to set the z-index and overflow as follows:

```
'z-index': <high-z-index> /* On lens element and ancestors */
'overflow': 'visible' /* On lens ancestors (overflow should be set
                to scroll on lens itself in order to allow
                scrolling of the lens content) */
```

Applying z-index and overflow on every ancestor may break the layout of some content, by causing ancestors to be painted on top of elements they should appear underneath or by removing expected clipping. Therefore, some embodiments may utilize an algorithm that minimizes changes to the DOM. This may have the additional benefit of providing better performance.

To minimize alteration of z-index and overflow on ancestors, it may be useful to address the two separately. Any suitable technique(s) may be used, some examples of which are provided below.

Minimizing z-index changes

To minimize z-index changes, in some embodiments the emphasis facility may only set the z-index on ancestor elements that actually change the stacking context and overlap the lens view. If there are no ancestors that force a stacking context, the emphasis facility may not set the z-index for any ancestors at all. Alternatively or additionally, the emphasis facility may set the z-index value of the lens and ancestors as low as possible, so that ancestors do not need to cover elements they should be underneath.

1. For each ancestor of the lens, get the computed z-index and store with the ancestor in an ordered JavaScript collection. Let us call this the ancestor-zindex list.
2. For each item in the stored list of ancestors and z-indexes: if the z-index of an ancestor is no different from the stored z-index of that ancestor's parent, then remove that element from the ancestor-zindex list.

This provides an ancestor-zindex list structured like the following:

```
<div>, z-index=30
    <table>, z-index=10 (descendant of div)
        *lens element*, z-index=MAX_ZINDEX (descendant of table)
```

The emphasis facility may be configured with MAX_Z-INDEX set to the maximum possible value for the z-index in the web browser being used. This may be the largest signed 32-bit integer, 2147483647.

Next, the emphasis facility may obtain a list of all elements that set the stacking context in the underlying content. This can be achieved in any suitable way, such as via brute force (for each element, compare the z-index against its parent element's z-index, to see if has changed), or by parsing the content's style sheets. In this case, any element that affects the z-index may be checked. The emphasis facility may compute the effective z-index by including anything that can affect the stacking context, such as z-index, opacity and transform properties.

Next, for each element that sets a z-index, and is not an ancestor of the lens, the emphasis facility may carry out the following process:

1. Check if the element's bounding rectangle intersects with the lens. Specifically, the rectangles intersect if Lens.left<Element.right AND Lens.right>Element.left AND Lens.top<Element.bottom AND Lens.bottom>Element.top.

If they intersect, go to step 2, else continue the loop with the next item (repeat step 1).
2. Find the first item in the ancestor-zindex list that has a lower z-index than the intersecting element's z-index. If none do, continue the loop with the next item (back to step 1).
3. Show the intersecting element in the ancestor-zindex list in front of the other intersecting element as follows:
    Set the z-index of the ancestor-zindex list item's element so that it's equal to the z-index of that intersecting element. Alternatively, reverse this, and set the z-index of the intersecting element so that it's the same as the item in the ancestor-zindex list.
4. Go back step 2, starting at the next position in the ancestor-zindex list.
5. Continue loop with next item (back to step 1)

Minimizing CSS overflow changes

To minimize CSS overflow changes, the emphasis facility may not change overflow properties when the bounds already encompass the set of related visible content element, because no clipping would occur. For example, the emphasis facility may carry out the following process:

1. Set current element to the top-level element selected by the selection facility as representing the set of related visible content elements.
2. Set current element to parent of current element.
3. If the horizontal bounds of the current element do not fully encompass the horizontal bounds of the lens, set overflow-x: visible.
4. If the vertical bounds of the current element do not fully encompass the vertical bounds of the lens, set overflow-y: visible.
5. If either overflow-x or overflow-y has been altered, go back to step 2, else stop.

In some embodiments, the emphasis facility may apply animation to the set of related visible content elements to be magnified in the lens, allowing size, positional and other style changes to be applied gradually over a time period, for example over a period of 400 ms. This may make the visual changes easier for the user to understand, as they may occur smoothly and not all at once.

In embodiments that use such animation, any suitable animation technique(s) may be used. As one example, the emphasis facility may use the following process to implement a transition animation:

0. Preparation step: Store the initial styles of the element. Store the current style values for the element. These styles can be restored at a later time in order to return the view to its original state where the lens was hidden/off.
1. Apply positioning & stacking context.
Using the transform property is explained in step 2.2. The current step is preparation for it. If the transform property has a value different than none, a stacking context will be created implicitly. In that case the object will act as a containing block for position: fixed elements that it contains. To have full control over animation the position may be set explicitly and the new stacking context created.
2. Prepare and set any pre-lens styles that can be pre-set before animation starts.
For example, border width animation may not be necessary. Some embodiments may set the new value for border width before the animation starts. Some other properties that may be set for the lens include, for example:
constrained width of lens;
expanded height of lens;

negative or positive margins to compensate the underlying content shift which was possibly caused by one of the two or both of previous styles;
contrast background color;
etc.

3. Build the full animation transition stack.

Due to the actions described in step 2, in some embodiments the current step may set as few properties as possible.

Some exemplary methods for applying animations include using:
Raw JavaScript to iteratively apply the property changes
Animation features in popular JavaScript frameworks such as jQuery
CSS Transitions provided in modern browsers, which allow property changes in CSS values to occur smoothly over a specified duration. In this case, supporting older browsers may be achieved by adding the vendor-supplied prefixes such as -moz and -o prefixes as well as the actual CSS3 transition property. The non-prefixed properties may be added last in the stack to ensure that the final implementation will trump the others as the property becomes standardized in newer browser versions.

4. Trigger the animations

This may be done via a method call to begin the animations or by setting an attribute that activates the CSS transition properties.

As discussed above in connection with FIG. 9, in some embodiments the emphasis facility may alter the display of visible content elements outside of the lens. For example, the emphasis facility may alter the view of the surrounding visible content elements to de-emphasize the surrounding visible content elements and provide a clear visual indication of the difference between lens and underlying content, and/or to bring the set of related visible content elements of the lens to the foreground with as little distraction as possible. Examples of alterations the emphasis facility may make include:

Dimming content outside of the lens. This may be generally designed to increase the contrast between the primary and secondary content, making the primary content visually more apparent.
Blurring content outside of the lens. The same idea as with the dimmer may be used in this item: to help draw attention to the lens content.
Stopping animations or movement in underlying content, which the inventors have recognized may be visually or cognitively distracting.
Adding borders, outlines or shadows to the lens. Some embodiments may use this approach rather adding borders/outlines/shadows via styles on the lens as described above, or when there are multiple top-level elements in the lens, as described above. The borders, outlines and shadows may thus be created as single polygons, thus avoiding overlaps. The source polygons can be generated via standard polygon merge algorithms (such as those described above in connection with FIG. 8) from the bounding rectangles of top-level elements selected by the selection facility.

In some embodiments, while the emphasis facility may make alterations to the view of surrounding visible content elements, these alterations may be made only to bring attention to the lens and to deemphasize the underlying content, without changing the placement of elements in the underlying content, as described above.

In the case of a web page, one exemplary implementation of dimmer that may be used by the emphasis facility is to draw an SVG element over the entire web page, with a hole drawn/clipped around the area of the lens content, letting the lens show through. Mouse-pointer events may be ignored on the SVG container so that the user can click on the document below the SVG overlay. The steps of an exemplary process that may be implemented by the emphasis facility are listed below:

1. Create an element using <svg>
2. Use SVG to create a shape that covers everything on the screen (or more, or less), with a hole cut out for the lens content to show through
3. Set the color and other presentation attributes of the SVG element
4. Set the opacity level of the SVG element so that the underlying content can show through it as a child of the <html> element
5. Set the z-index to the maximum value, so that it shows above all other content
6. Insert the new element as a child of the <html> element in the DOM Using an SVG element in this way may have some potential advantages:
It can very precisely control the shape of the highlighted area
SVG paths look crisp/sharp when zoomed in
It performs faster than an HTML <canvas> approach
It uses minimal code to ensure that the overlay is drawn over all underlying content, by putting it as a child of the document itself (making the overlay a high-level element in the DOM), which ensures it can control its own stacking context.

In some other embodiments, the emphasis facility may implement the overlay as part of the lens itself (e.g., in the same subtree of the DOM as the lens content). In this case, additional z-index changes to ancestors may be desirable in order to ensure that the overlay is rendered over all other content. These additional ancestor z-index changes could have the effect in some situations of causing ancestors of the related visible content elements of the lens to render over elements they were intended to be underneath.

Other relevant techniques may include inserting the SVG element in a different location in the DOM or as a pseudo element, or using CSS outline, border or box-shadow to render, or any other suitable techniques.

As should be appreciated from the foregoing, in some embodiments the selection facility and/or the emphasis facility may be implemented as scripting language code that is incorporated into a markup language document, such as code that is incorporated into an HTML document. In some such cases, the selection facility and/or the emphasis facility may be incorporated into the markup language manually, by a developer (e.g., a web developer) that creates the markup language document. The selection facility and/or the emphasis facility may be incorporated by a developer in cases where the developer expects that a substantial number of users of the markup language document may benefit from use of the selection facility and/or the emphasis facility, such as in a case that many of the users will have difficulties or disabilities in eyesight or may be unfamiliar with the operations of computers.

In other embodiments, however, the selection facility and/or the emphasis facility may be incorporated into the markup language document automatically, such as by an insertion facility that is configured to insert the selection facility and/or the emphasis facility into markup language documents. The insertion facility may be implemented in any suitable manner, as embodiments are not limited in this respect. In some embodiments, for example, the insertion facility may be implemented as part of a proxy server or other server that relays markup language documents. The proxy server may, for example, be a server that is intended for use by users who have difficulties or disabilities with eyesight, or are unfamiliar with the operations of computers. These users may access markup language documents via the proxy server such that the proxy server relays the documents to the devices after the proxy server has edited the documents to insert the selection facility and/or the emphasis facility, such that the selection facility and/or the emphasis facility is available for use by the users. Such a proxy server may be used in any suitable manner, including known techniques. As one example, a viewing application (e.g., web browser) may be configured to access markup language documents via the proxy server.

As another example of a manner in which an insertion facility may operate to incorporate the selection facility and/or emphasis facility into the markup language document, the insertion facility may be implemented as a portion of a viewing application, such as a plug-in to a viewing application, that is executed on a device operated by a user. When the user operates the viewing application to download and process markup language documents, the insertion facility may edit the markup language documents to incorporate the selection facility and/or the emphasis facility.

Figure 10:
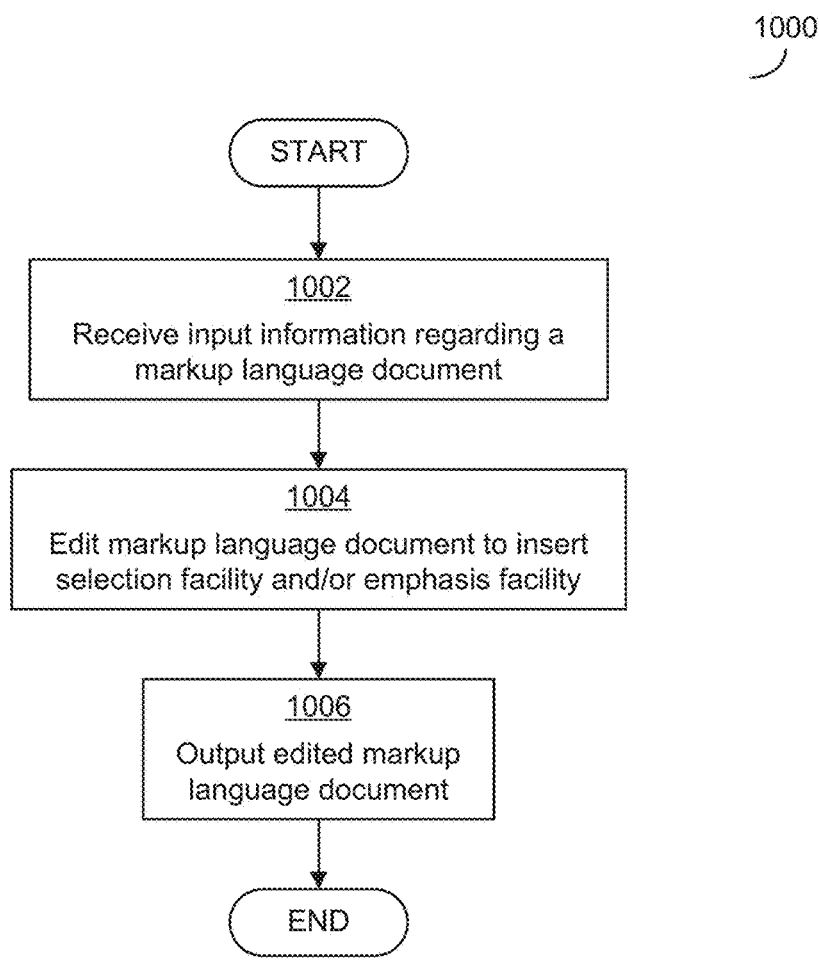
FIG. 10 is a flowchart of an illustrative process for incorporating a selection facility and/or emphasis facility into a markup language document, which may be implemented in some embodiments.

FIG. 10 illustrates an example of a process that an insertion facility may carry out in some embodiments to incorporate a selection facility and/or emphasis facility into a markup language document. The process 1000 of FIG. 10 begins in block 1002, in which the insertion facility receives input information regarding a markup language document. The information received in block 1002 may be the markup language document itself or information describing the markup language document, such as an address from which the markup language document may be downloaded. If the insertion facility does not receive the markup language document in block 1002, the insertion facility downloads the markup language document. In block 1004, the insertion facility edits the markup language document to incorporate the selection facility and/or the emphasis facility. As discussed above, the selection facility and/or the emphasis facility may be incorporated in any suitable manner, including by being inserted entirely into the markup language document or by being disposed in one or more other files that is/are referenced by one or more markup elements of the markup language document. Once the edited of block 1004 is completed, in block 1006 the insertion facility outputs the edited markup language document, such as by passing the edited markup language document to another component of a viewing application to be processed or by communicating the edited markup language document over a network. After the output of block 1006, the process 1000 ends.

Figure 11:
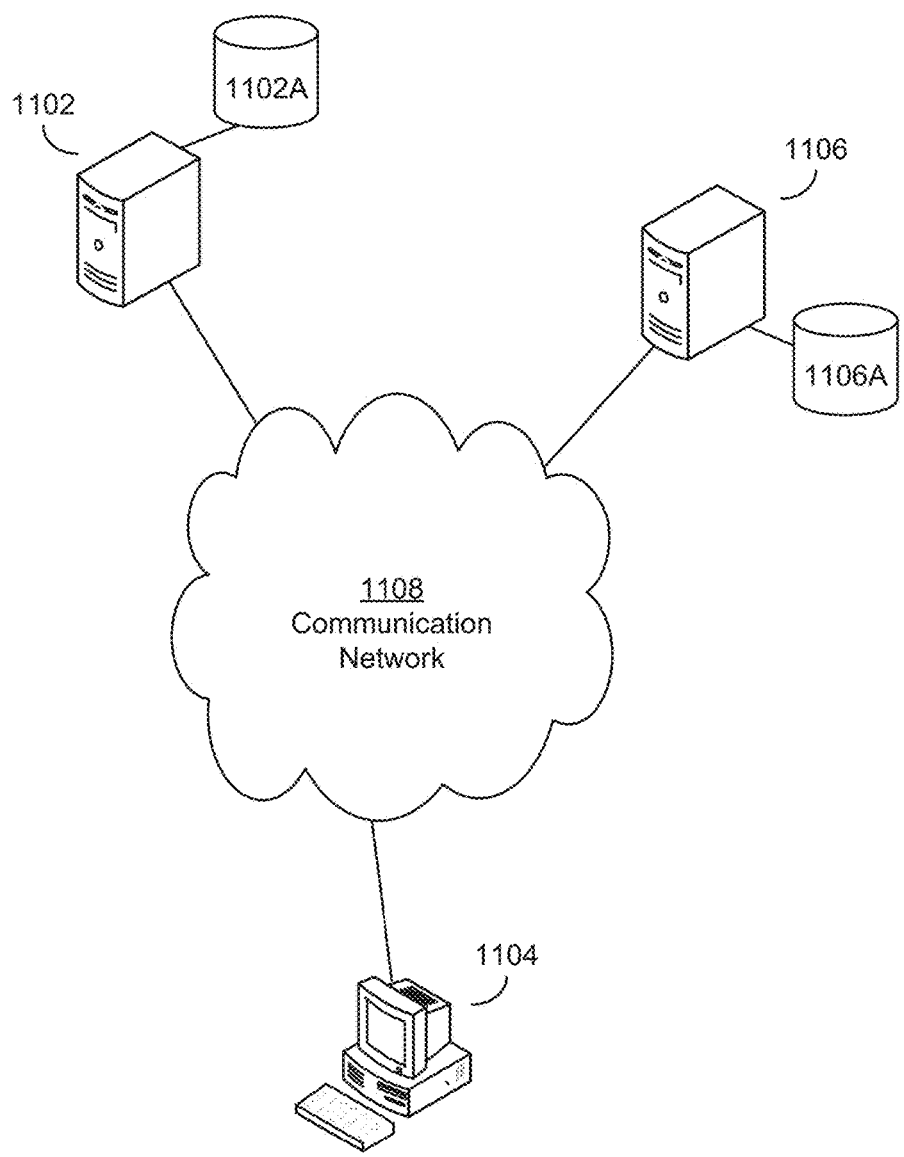
FIG. 11 is a diagram of a computer system with which some embodiments may operate.

FIG. 11 illustrates an example of a computer system in which some embodiments may operate. The computer system of FIG. 11 includes a computing device 1102 that includes a data store 1102A. While computing device 1102 is illustrated as a single server, it should be appreciated that it may be implemented as any suitable one or more computing devices that may communicate over a communication network, as embodiments are not limited in this respect. Data store 1102A may also be implemented in any suitable manner. Data store 1102A may store one or more markup language documents. The computer system also includes a computing device 1104 that may execute a viewing application that is operated by a user to download, process, and display a markup language document. While the computing device 1104 is illustrated in FIG. 11 as a desktop personal computer, it should be appreciated that embodiments are not so limited and that the device 1104 may be implemented as a laptop personal computer, a smart phone, a tablet computer, a gaming device, a web-enabled television, or any number of other devices that may be operated by users to download, process, and view markup language documents. In some embodiments, the computing device 1104 may communicate directly with the computing device 1102 to request a markup language document stored in the data store 1102A, and the markup language document returned from the device 1102 may have a selection facility and/or an emphasis facility incorporated therein. In other embodiments, as discussed above in connection with FIG. 10, the computing device 1104 may request the markup language document via an intermediary computing device 1106. The intermediary computing device 1106, which may be implemented as any suitable computing device, may have a data store 1106A that stores a selection facility and/or an emphasis facility. The intermediary computing device 1106 may act as a relay for markup language documents between the device 1102 and the device 1104 and may, as part of the relay, edit the markup language document to insert a selection facility and/or an emphasis facility. Communications between the devices 1102, 1104, and 1106 may be exchanged via a communication network 1108, which may be any suitable one or more wired and/or wireless computer networks, including local area networks, wide area networks, and/or the Internet.

Techniques operating according to the principles described herein may be implemented in any suitable manner. Included in the discussion above are a series of flow charts showing the steps and acts of various processes that select a group of related visible content elements of at least one markup language document and edit the at least one markup language document to emphasize those visible content elements while maintaining surrounding visible content elements in an original format. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code.

Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1206 or 1306 of FIGS. 12-13 described below (i.e., as a portion of a computing devices 1200 or 1300) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 11, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 12:
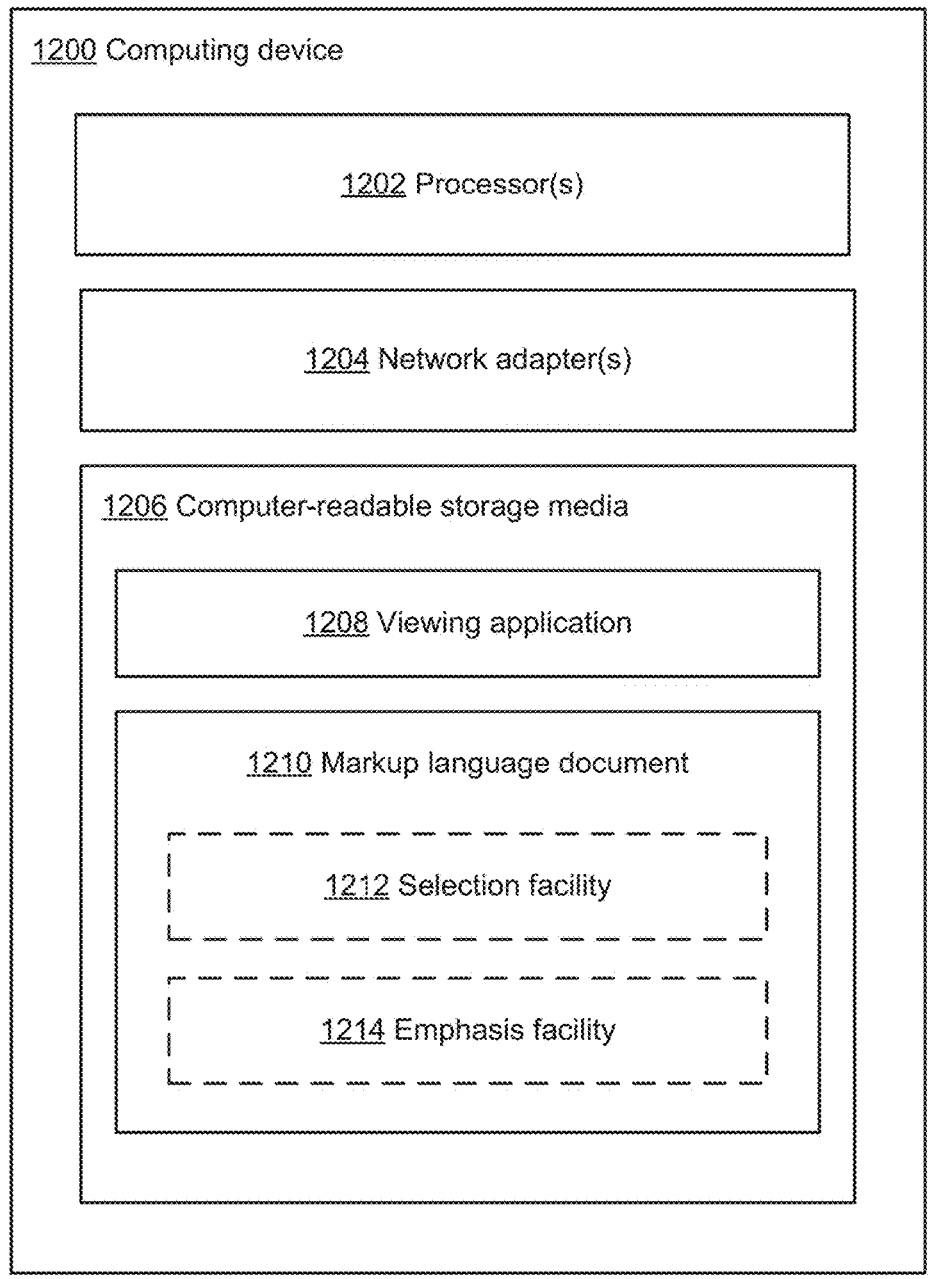
FIGS. 12-13 are block diagrams of some components of computing devices with which some embodiments may operate.

FIG. 12 illustrates one exemplary implementation of a computing device in the form of a computing device 1200 that may be used in a system implementing techniques described herein, although others are possible. It should be appreciated that FIG. 12 is intended neither to be a depiction of necessary components for a computing device to operate as a computing device operated by a client to view markup language documents in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a personal digital assistant (PDA), a smart mobile phone, a tablet computer, a server, a gaming device, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1206 may be adapted to store data to be processed and/or instructions to be executed by processor 1202. Processor 1202 enables processing of data and execution of instructions. The data and instructions may be stored on the computer-readable storage media 1206.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store a viewing application 1208 to process and view markup language documents (e.g., a web browser to view web pages) using known techniques. Media 1206 may also store one or more markup language documents 1210 that have incorporated therein a selection facility 1212 and an emphasis facility 1214.

Figure 13:
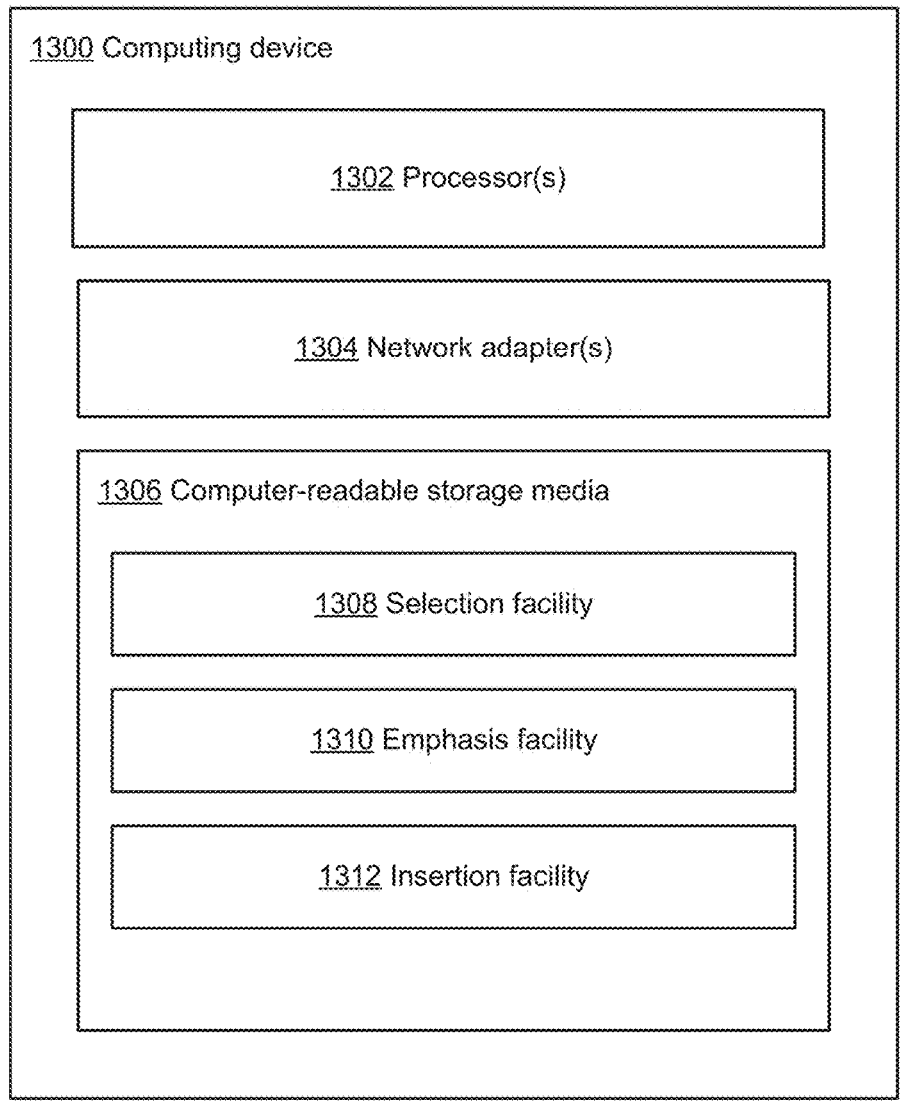

FIG. 13 illustrates one exemplary implementation of a computing device in the form of a computing device 1300 that may be used in a system implementing techniques described herein, although others are possible. It should be appreciated that FIG. 13 is intended neither to be a depiction of necessary components for a computing device to operate as an intermediary computing device in accordance with the principles described above in connection with FIG. 11, nor a comprehensive depiction.

Computing device 1300 may comprise at least one processor 1302, a network adapter 1304, and computer-readable storage media 1306. Computing device 1300 may be, for example, a desktop or laptop personal computer, a server, a rack-mounted computer or other networking element, or any other suitable computing device. Network adapter 1304 may be any suitable hardware and/or software to enable the computing device 1300 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1306 may be adapted to store data to be processed and/or instructions to be executed by processor 1302. Processor 1302 enables processing of data and execution of instructions. The data and instructions may be stored on the computer-readable storage media 1306.

The data and instructions stored on computer-readable storage media 1306 may comprise computer-executable instructions implementing techniques which operate according to the principles described herein. In the example of FIG. 13, computer-readable storage media 1306 stores computer-executable instructions implementing various facilities and storing various information as described above. Computer-readable storage media 1306 may store a selection facility 1308, an emphasis facility 1310, and an insertion facility 1312.

While not illustrated in FIGS. 12-13, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
   identifying a first visible content element of at least one markup language document; and
   automatically determining whether the first visible content element is a member of a group of visible content elements distinct from surrounding visible content elements, wherein the automatically determining comprises:
   analyzing a layout of visible content elements of the at least one markup language document in an area of the at least one markup language document that includes the first visible content element to determine whether the layout indicates that the first visible content element is a member of a group of visible content elements distinct from surrounding visible content elements; and
   analyzing one or more markup elements of the at least one markup language document to determine whether the one or more markup elements indicate that the first visible content element is a member of a group of visible content elements distinct from surrounding visible content elements, wherein the step of analyzing the one or more markup elements comprises the steps of:
- determining, from a hierarchical arrangement of content elements of the markup language document, a set of candidate content elements including the first visible content element and content elements directly above the first visible content element in the hierarchical arrangement;
- evaluating each one candidate content element of the set to determine whether the one candidate content element includes a group of visible content elements that includes the first visible content element and is distinct from surrounding visible content elements, wherein evaluating each one candidate content element of the set comprises the steps of:
  - analyzing a layout of the markup language document in an area of the one candidate content element;
  - analyzing the one candidate content element with respect to a plurality of factors to determine a score for each factor;
  - calculating an overall score for the one candidate content element based on the scores for the plurality of factors;
- determining a highest-scoring candidate content element of the set;
- in a case that the highest-scoring candidate content element includes one or more other visible content elements in addition to the first visible content element, determining that the first visible content element is a member of a group of visible content elements distinct from surrounding visible content elements; and
- in a case that the highest-scoring candidate content element does not include any other visible content elements in addition to the first visible content element, determining that the first visible content element is not a member of a group of visible content elements distinct from surrounding visible content elements.

2. The method of claim 1, further comprising:
in response to determining that the first visible content element is a member of a group of visible content elements distinct from surrounding visible content elements, performing at least one task on each visible content element of the group; and
in response to determining that the first visible content element is not a member of a group of visible content elements distinct from surrounding visible content elements, performing the at least one task on the first visible content element and not on other visible content elements.

3. The method of claim 1, wherein analyzing the one candidate content element with respect to a plurality of factors to determine a score for each factor comprises determining one or more scores based on a comparison of one or more dimensions of the one candidate content element and one or more dimensions of an immediate parent of the one candidate content element and/or one or more dimensions of an immediate child of the one candidate content element.

4. The method of claim 1, wherein analyzing the one candidate content element with respect to a plurality of factors to determine a score for each factor comprises determining one or more scores based on an evaluation of an amount of whitespace separating the one candidate content element from an adjacent content element on one or more sides and/or whether the one candidate content element is separated from an adjacent content element on one or more sides by a border.

5. The method of claim 1, wherein analyzing the one candidate content element with respect to a plurality of factors to determine a score for each factor comprises determining one or more scores based on an evaluation of whether a layout of the one candidate content element and/or markup elements of the one candidate content element and/or sibling content elements of the one candidate content elements meet criteria indicating that the one candidate content element is a cell of a repeating layout of cells.

6. The method of claim 1, wherein analyzing the layout in the area of the at least one markup language document that includes the first visible content element to determine whether the layout indicates that the first visible content element is a member of a group of visible content elements distinct from surrounding visible content elements comprises evaluating an amount of whitespace separating the first visible content element from adjacent visible content elements.

7. The method of claim 1, wherein analyzing the layout in the area of the at least one markup language document that includes the first visible content element to determine whether the layout indicates that the first visible content element is a member of a group of visible content elements distinct from surrounding visible content elements comprises evaluating whether a background of the first visible content element differs from a background of adjacent visible content elements and whether the first visible content element is separated from adjacent visible content elements on one or more sides by a border.

8. The method of claim 1, wherein analyzing the one or more markup elements of the at least one markup language document to determine whether the one or more markup elements indicate that the first visible content element is a member of a group of visible content elements distinct from surrounding visible content elements comprises determining whether the one or more markup elements relating to the first visible content elements satisfy criteria indicating that the first visible content element appears within a cell of a repeating layout of cells in the at least one markup language document.

9. The method of claim 8, wherein determining whether the one or more markup elements relating to the first visible content elements satisfy the criteria comprises determining whether one or more other markup elements relating to other content elements that are siblings in a hierarchical arrangement of content elements for the at least one markup language document satisfy the criteria.

10. The method of claim 1, wherein the automatically determining comprises automatically determining in response to determining, from an evaluation of the at least one markup language document, that the at least one markup language document does not include an express indication of whether the first visible content element is a member of a group of visible content elements distinct from surrounding visible content elements.

11. The method of claim 1, wherein the at least one markup language document comprises executable instructions that, when executed by a viewing application that processes and displays visible content elements of the at least one markup language document, cause the viewing application to perform the identifying and the automatically determining, and the identifying and the automatically determining comprise executing, with the viewing application, the executable instructions.

12. The method of claim 11, wherein the at least one markup language document is at least one document of a web page, and the viewing application is a web browser.

13. The method of claim 11, wherein the executable instructions define the identifying and the automatically determining to be independent of the at least one markup language document and applicable to other markup language documents.

14. At least one computer-readable storage medium having encoded thereon at least one markup language document, the at least one markup language document having incorporated therein executable instructions that, when executed by at least one processor, cause the at least one processor to carry out a method comprising:
identifying a first visible content element, of the at least one markup language document, indicated by user input;
determining, from a hierarchical arrangement of content elements of the at least one markup language document, one or more parent content elements directly above the first visible content element in the hierarchical arrangement; and
analyzing each one parent content element of the one or more parent content elements to determine whether the one parent content element includes a distinct set of visible content elements that include the first visible content element and satisfy criteria indicating that a publisher of the at least one markup language document intended for the distinct set of visible content elements to be viewed together as a group, wherein the step of analyzing each one parent content element comprises the steps of:
scoring each one content element of the one or more parent content elements and the first visible content element based on the criteria indicating that a publisher of the at least one markup language document intended for a distinct set of visible content elements to be viewed together as a group; and
selecting the highest-scoring content element between the one or more parent content elements and the first visible content element; and in a case that the highest-scoring content element includes one or more visible content elements in addition to the first visible content element, determining that the highest-scoring visible content satisfies the criteria indicating that a publisher of the at least one markup language document intended for a distinct set of visible content elements to be viewed together as a group.

15. The at least one computer-readable storage medium of claim 14, wherein scoring each one content element of the one or more parent content elements and the first visible content element based on the criteria comprises scoring each one content element based on a determination of whether the one content element and any descendent content elements of the one content element comprise a single image or a single text header.

16. The at least one computer-readable storage medium of claim 14, wherein scoring each one content element of the one or more parent content elements and the first visible content element based on the criteria comprises scoring each one content element based on an evaluation of visual separation between the one content element and an adjacent content element on one or more sides.

17. The at least one computer-readable storage medium of claim 16, wherein scoring each one content element based on an evaluation of visual separation between the one content element and an adjacent content element on one or more sides comprises, for a first side of a one content element that is a container for one or more child visible content elements:
determining one of the child visible content element that is positioned closest to the first side of the container; and
using, as the visual separation between the container and an adjacent content element on the first side, the visual separation between the child visible content element and the adjacent content element on the first side.

18. A method comprising:
identifying a first visible content element of at least one markup language document; and
automatically determining whether the first visible content element is a member of a group of visible content elements distinct from surrounding visible content elements, wherein the automatically determining comprises:
analyzing a layout of visible content elements of the at least one markup language document in an area of the at least one markup language document that includes the first visible content element to determine whether the layout indicates that the first visible content element is a member of a group of visible content elements distinct from surrounding visible content elements; and
analyzing one or more markup elements of the at least one markup language document to determine whether the one or more markup elements indicate that the first visible content element is a member of a group of visible content elements distinct from surrounding visible content elements;
wherein analyzing the layout in the area of the at least one markup language document that includes the first visible content element to determine whether the layout indicates that the first visible content elements is a member of a group of visible content elements distinct from surrounding visible content elements comprises evaluating an amount of whitespace separating the first visible content element from adjacent visible content elements.

19. The method of claim 18, further comprising:
in response to determining that the first visible content element is a member of a group of visible content elements distinct from surrounding visible content elements, performing at least one task on each visible content element of the group; and
in response to determining that the first visible content element is not a member of a group of visible content elements distinct from surrounding visible content elements, performing the at least one task on the first visible content element and not on other visible content elements.

20. A method comprising:
identifying a first visible content element of at least one markup language document; and
automatically determining whether the first visible content element is a member of a group of visible content elements distinct from surrounding visible content elements, wherein the automatically determining comprises:
analyzing a layout of visible content elements of the at least one markup language document in an area of the at least one markup language document that includes the first visible content element to determine whether the layout indicates that the first visible content element is a member of a group of visible content elements distinct from surrounding visible content elements; and analyzing one or more markup elements of the at least one markup language document to determine whether the one or more markup elements indicate that the first visible content element is a member of a group of visible content elements distinct from surrounding visible content elements;

wherein analyzing the layout in the area of the at least one markup language document that includes the first visible content element to determine whether the layout indicates that the first visible content element is a member of a group of visible content elements distinct from surrounding visible content elements comprises evaluating whether a background of the first visible content element differs from a background of adjacent visible content elements and whether the first visible content element is separated from adjacent visible content elements on one or more sides by a border.

21. The method of claim 20, further comprising:

in response to determining that the first visible content element is a member of a group of visible content elements distinct from surrounding visible content elements, performing at least one task on each visible content element of the group; and in response to determining that the first visible content element is not a member of a group of visible content elements distinct from surrounding visible content elements, performing the at least one task on the first visible content element and not on other visible content elements.

* * * * *